US006658212B1

(12) United States Patent
Trutna, Jr. et al.

(10) Patent No.: US 6,658,212 B1
(45) Date of Patent: Dec. 2, 2003

(54) POLARIZATION-INDEPENDENT, CONFIGURABLE OPTICAL MULTIPLEXER

(75) Inventors: William R. Trutna, Jr., Atherton, CA (US); Charles D. Hoke, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 575 days.

(21) Appl. No.: 09/703,400

(22) Filed: Oct. 31, 2000

(51) Int. Cl.[7] ............................................. H04J 14/02
(52) U.S. Cl. ........................... 398/84; 398/152; 398/65; 398/79; 398/87; 385/37; 385/24
(58) Field of Search ..................... 385/37, 24; 398/152, 398/43, 65, 84, 79, 87, FOR 106

(56) References Cited

U.S. PATENT DOCUMENTS

| | | | | |
|---|---|---|---|---|
| 5,414,540 A | * | 5/1995 | Patel et al. | 349/196 |
| 5,917,625 A | * | 6/1999 | Ogusu et al. | 385/24 |
| 6,285,500 B1 | * | 9/2001 | Ranalli et al. | 359/497 |
| 6,337,935 B1 | * | 1/2002 | Ford et al. | 385/24 |

OTHER PUBLICATIONS

Westphal, F.J. et al., "Transparent All–Optical Interconnection of Two Independent Experimental OFDM–LAN's via One Central Node", IEEE Photonics Technology Letters, vol. 7, No. 1, Jan. 1995, pp. 95–97.
Pfeifer, T. et al., "Electro–Optic Measurement of the Electric Near–Field Distribution of 7 GHz Planar Resonator", Electronics Letters, vol. 32, No. 14, Jul. 4, 1996, pp. 1305–1307.
NASA's Jet Propulsion Laboratory, "Distortion would be Minimized by Use of Modified Offner Optics" Low–Distortion Imaging Spectrometers, pp. 1–3.
NAN's Jet Propulsion Laboratory, "Compact, Well–Corrected Optics would be Suitable for Imaging Spectroscopy in Commercial Applications, Convex–Grating Spectrometer with Two Spherical Mirrors", pp. 1–2.
JDS Uniphase, "Configurable Optical Add Drop Multiplexers", COADM Series, pp. 1–6.

* cited by examiner

*Primary Examiner*—Hung N. Ngo
(74) *Attorney, Agent, or Firm*—Ian Hardcastle

(57) ABSTRACT

The frequency-selective optical multiplexer comprises, an LC polarization controller, a spectral demux/mux and input/output optics including two ports, a first optical path spatially separated from a second optical path and polarization-dispersive optics. The polarization dispersive optics are disposed between the ports and the optical paths; generate from an optical signal a pair of polarization components, composed of a first polarization component and a second polarization component having orthogonal polarizations; and output the first and second polarization components via the first and second optical paths, respectively. The first and second polarization components have first and second polarizations when the optical signal is received at one port, and have the second and the first polarizations, respectively, when the optical signal is received at the other port. The spectral demux/mux generates first pairs of spatially-separated spectral components from a first pair of orthogonal polarization components received from the input/output optics, outputs the spectral components to the polarization controller, receives respective second pairs of spectral components from the polarization controller, and spatially overlaps the second pairs of spectral components to generate a second pair of polarization components. Either the first pair or the second pair of polarization components passes between the spectral demux/mux and the input/output optics via the optical paths. The polarization controller receives the first pairs of spectral components at a zero angle of incidence, and rotates the polarizations of each of them individually and selectively through 0° or 90° to generate one of the second pairs of spectral components.

20 Claims, 15 Drawing Sheets

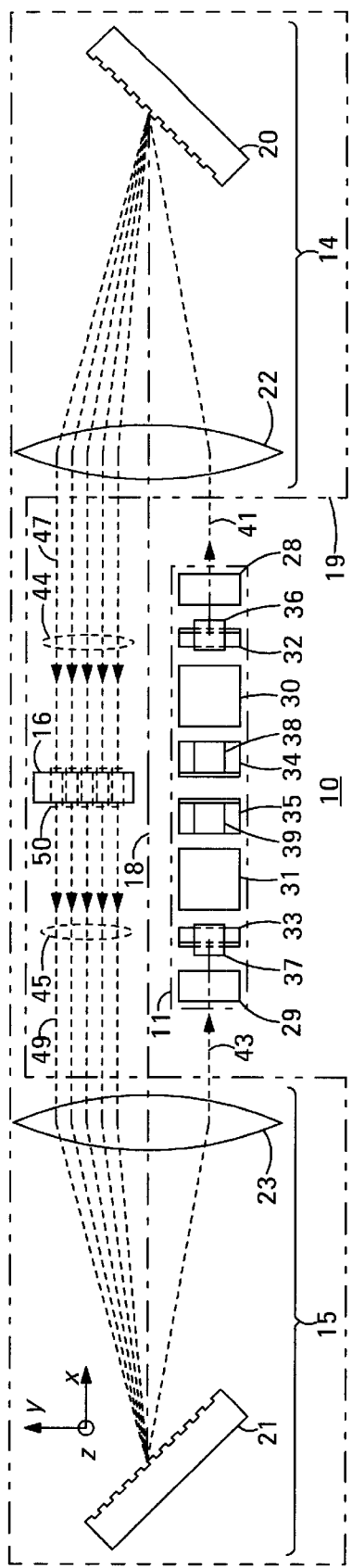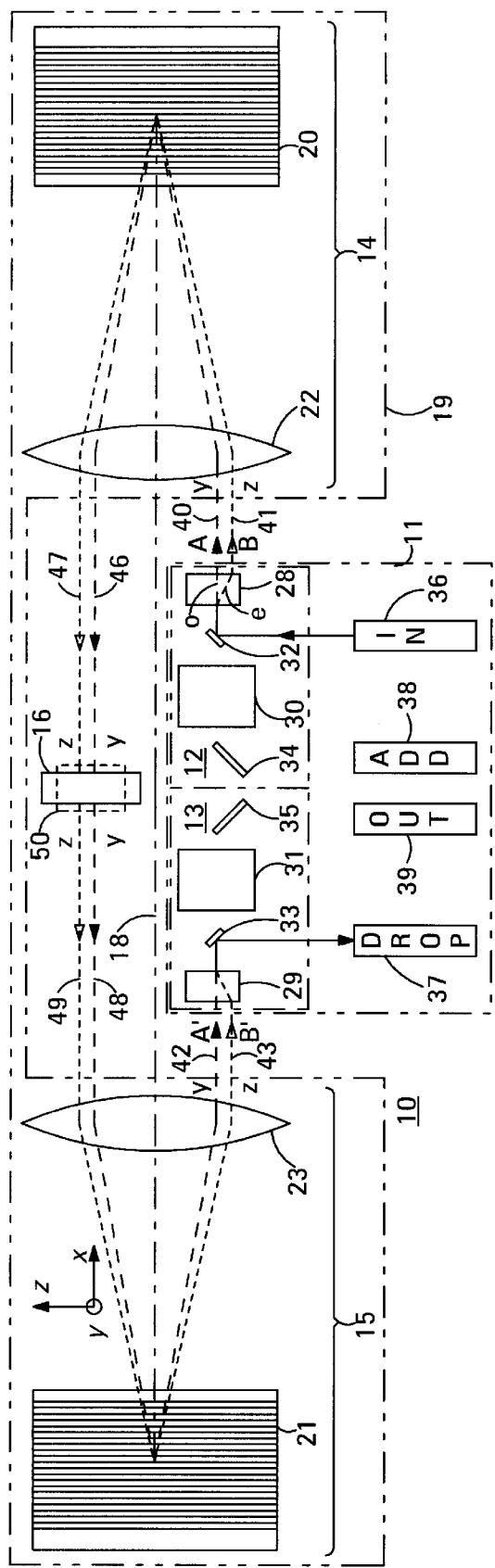
FIG.1A
FIG.1B

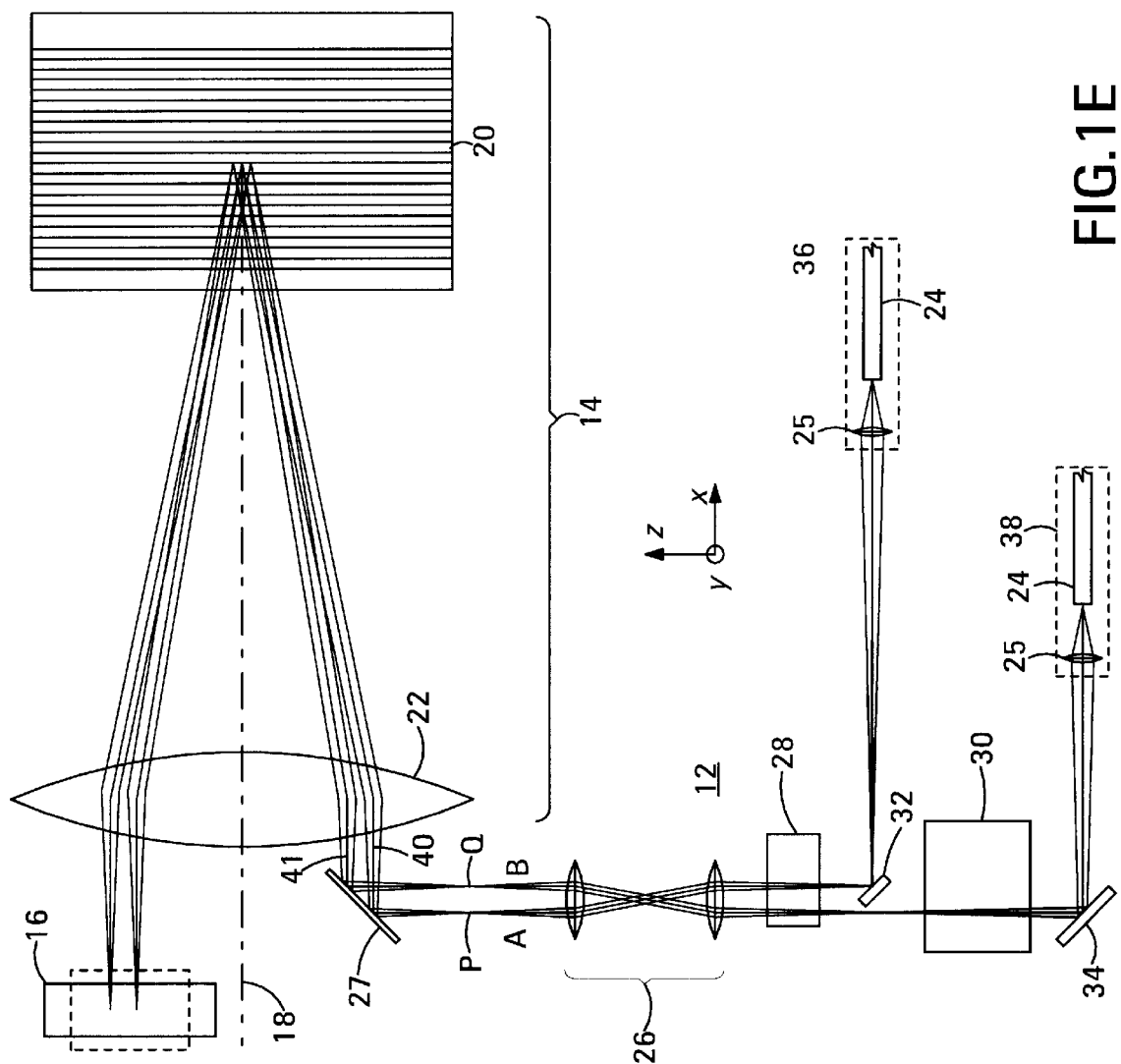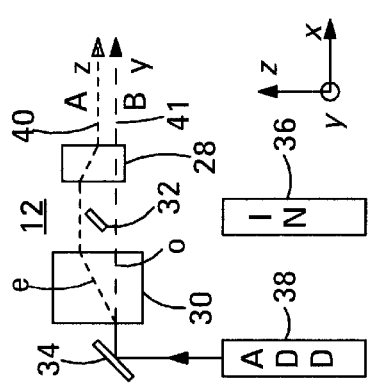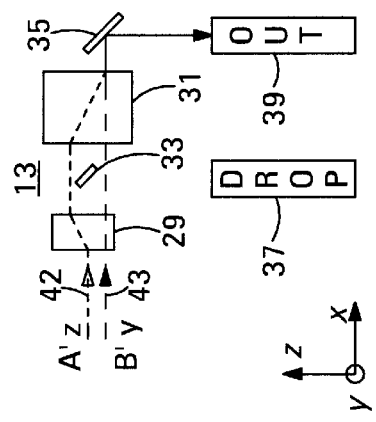

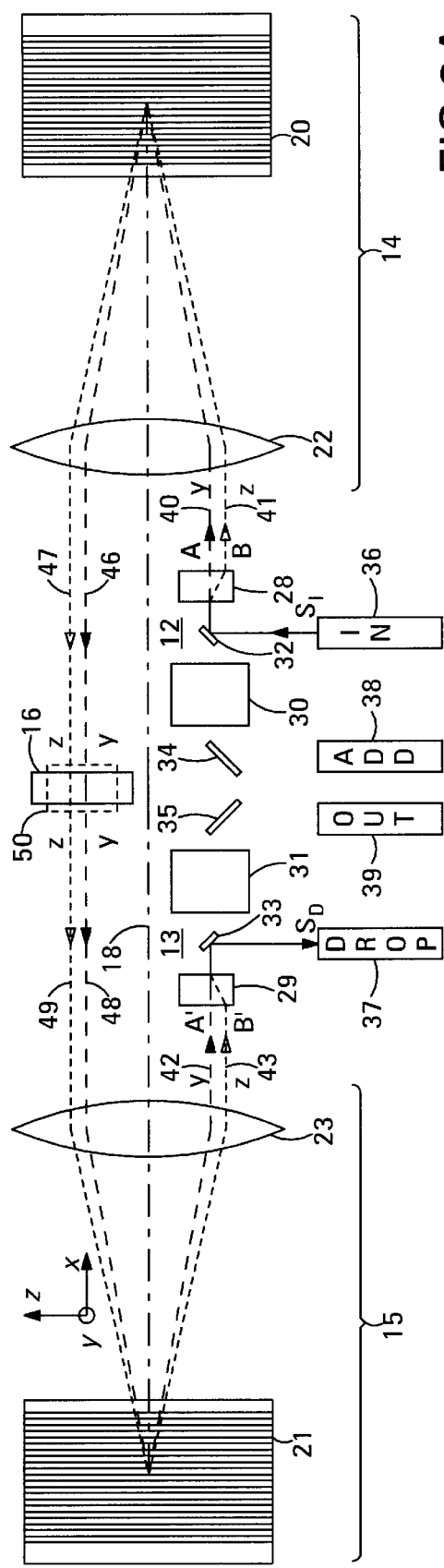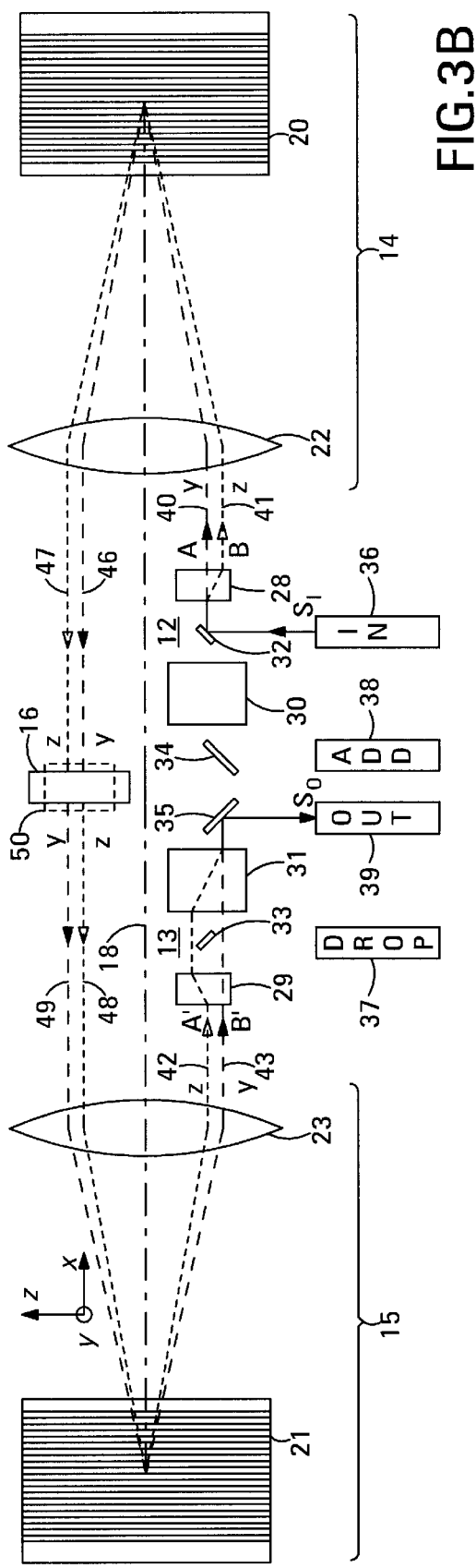

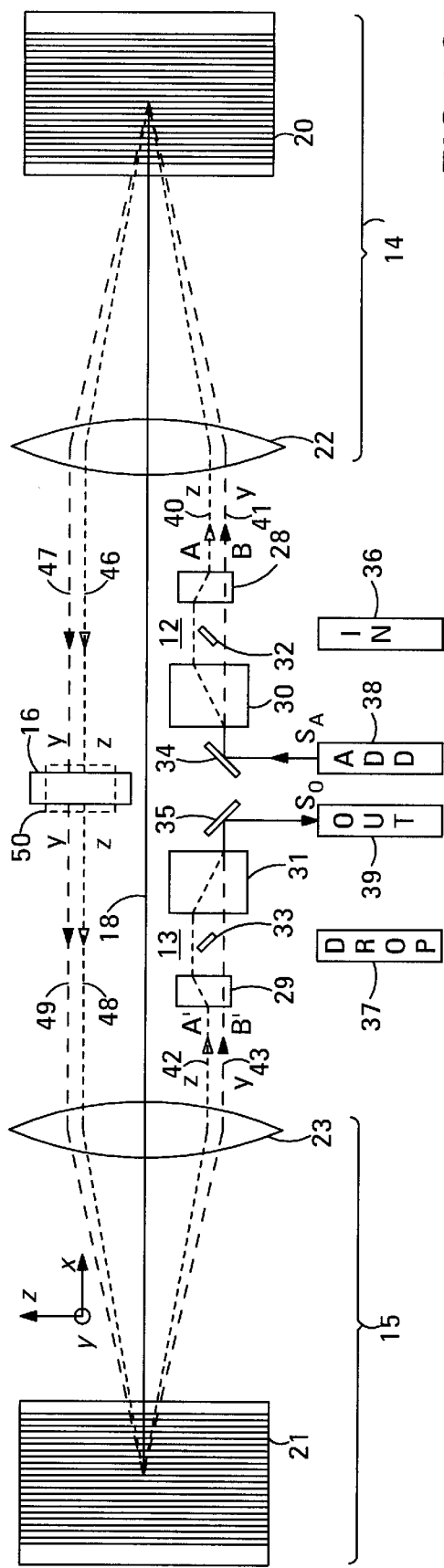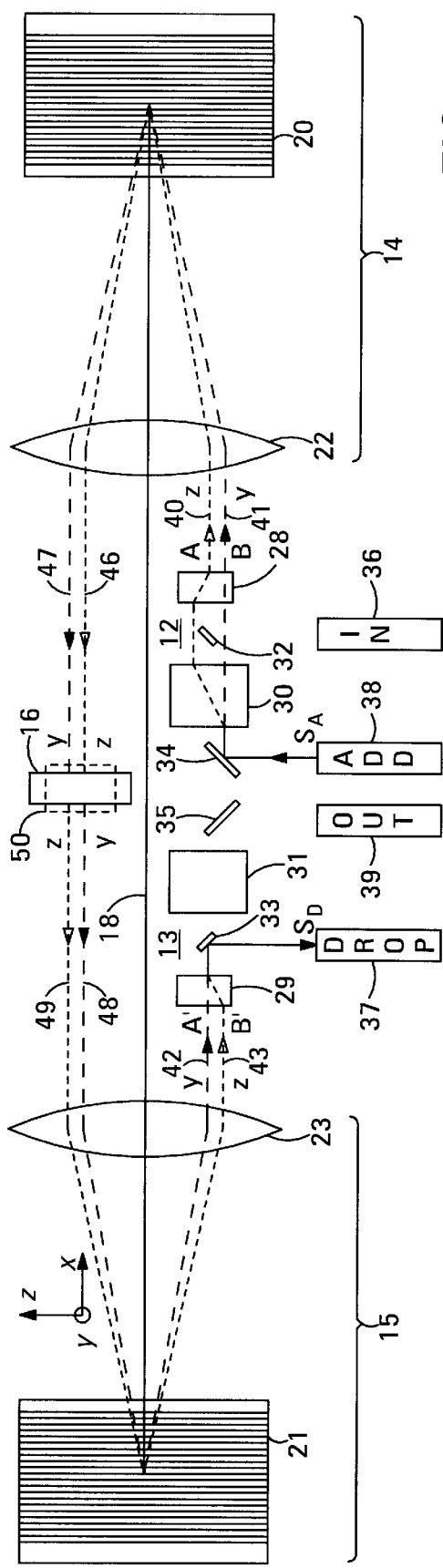

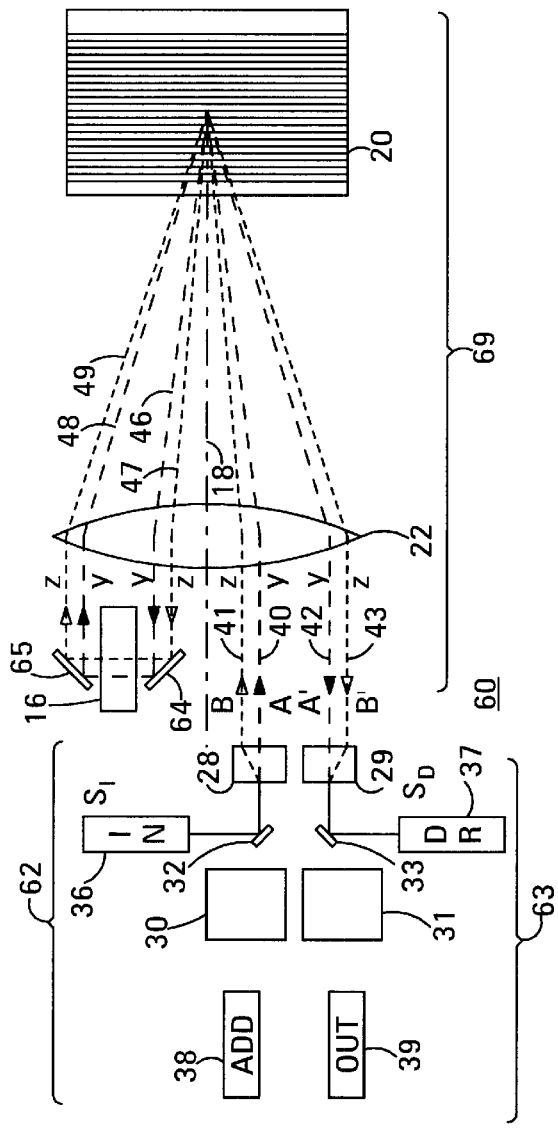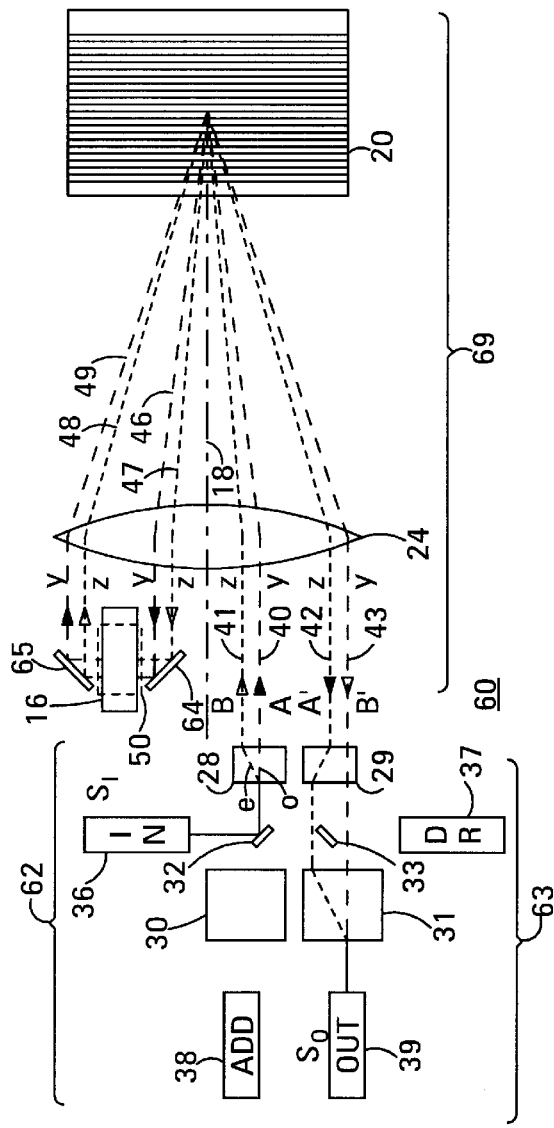

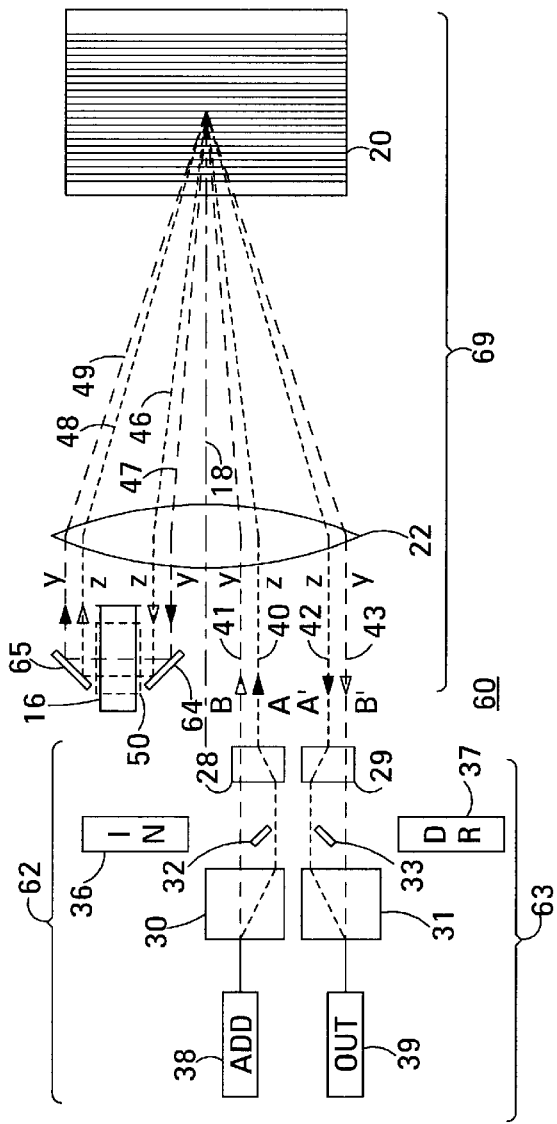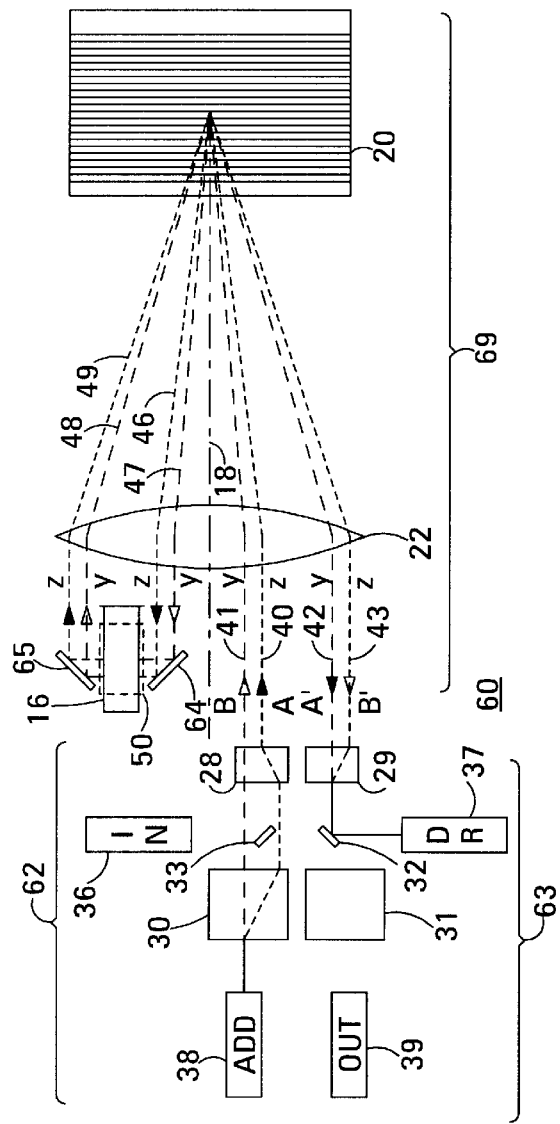

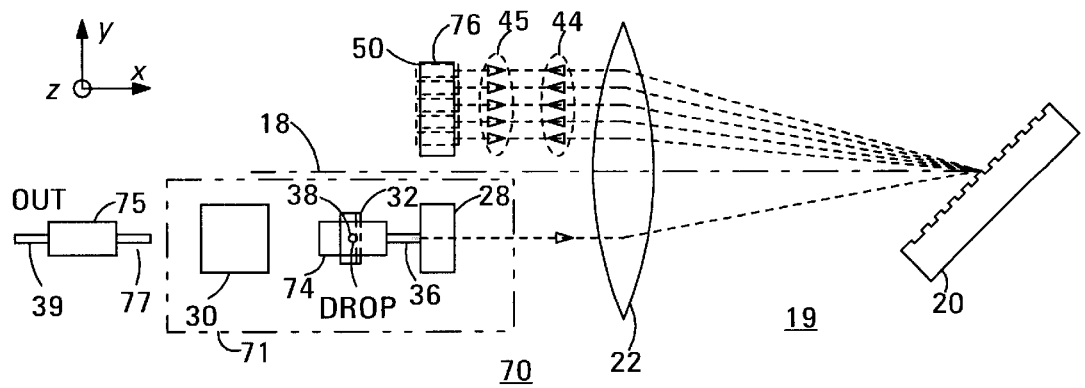
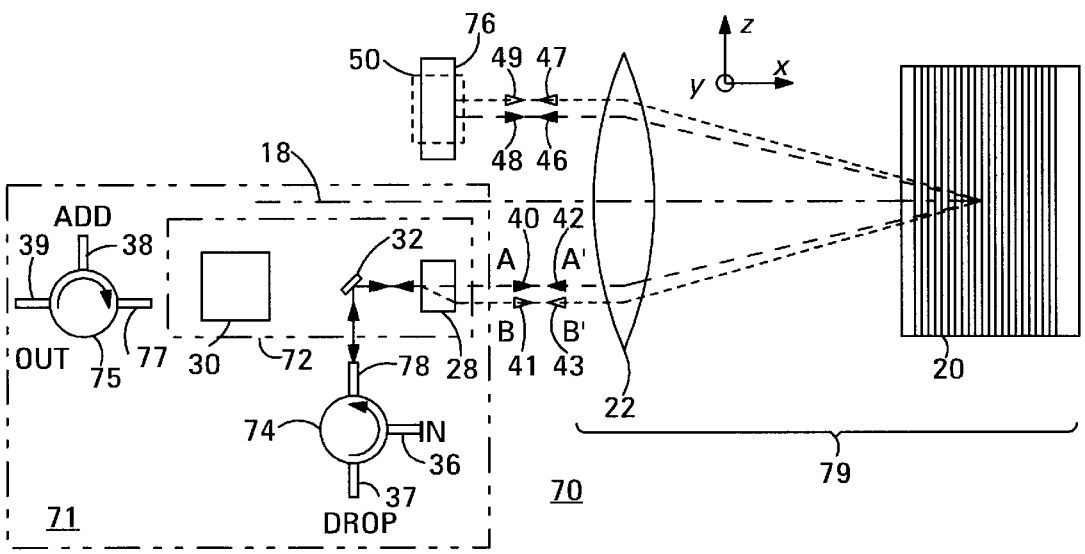
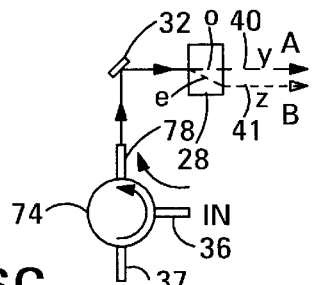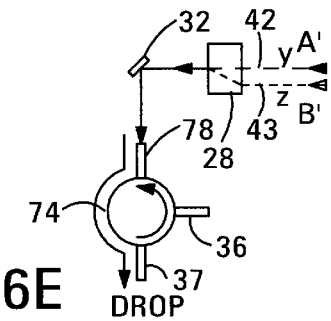
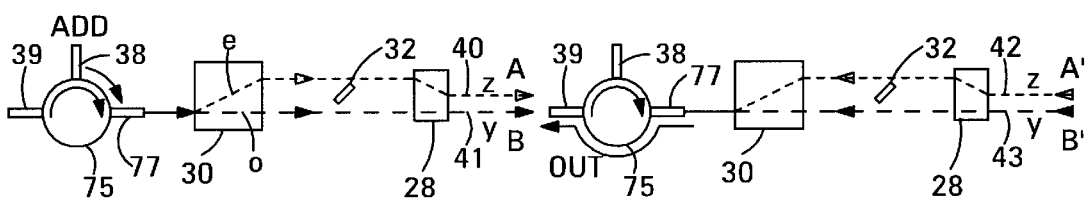

POLARIZATION-INDEPENDENT, CONFIGURABLE OPTICAL MULTIPLEXER

FIELD OF THE INVENTION

The invention relates to multiplexers for optical signals. More particularly, the invention relates to a configurable optical multiplexer having multiple channels whose operational states can be independently controlled to add, drop and pass optical signals.

BACKGROUND OF THE INVENTION

Dense wave-division multiplexing (DWDM) is a technique in which multiple optical signals having different wavelengths are transmitted through a single optical fiber. DWDM enables the volume of data that can be transmitted by an individual optical fiber to be multiplied by approximately n, where n is the number of different wavelengths. Typically, networks employing DWDM are arranged with a ring topology in which several optical add-drop multiplexers (OADMs) are connected by optical fibers to form a loop. The OADMs are used to add particular optical signals to, and drop particular optical signals from, the network. The OADM may drop from the network an optical signal destined for another network element and feed such optical signals such other network element, or may add an optical signal received from another network element to a channel of the network. The other network element may be an end user, a direct or indirect connection to or from an end user, another network or a direct or indirect connection to or from another network.

Conventional add-drop multiplexers used in DWDM networks have fixed add-drop channels. Such fixed OADMs are only capable of adding or dropping an optical signal of a given frequency, and therefore are inflexible in their operation. Such inflexibility imposes limitations on the flow of traffic through the network and between the network and other network elements.

More recently, configurable optical add-drop multiplexers (COADMS) have been proposed in an effort to avoid the limitations imposed by fixed OADMs. Configurable optical add-drop multiplexers are sometimes referred to in the art as reconfigurable optical add-drop multiplexers (ROADMS). A COADM is configurable in the sense that the operational mode, i.e., drop, pass, add and add-drop, of each of its channels can be individually set by a control signal and by providing the appropriate input signal. COADMS based on optical multiplexers and 2×2 optical switches are sold by JDS Uniphase Corp., for example, and are described at <http://www.jdsuniphase.com/HTML/catalog/products/menu_srch.cfm?-fn=coadm.html>. However, such COADMS do not scale well to large port counts due to insertion losses and high manufacturing costs.

COADMS based on a diffraction grating and slit have been proposed by F. N. Timofeev, P. Bayvel, E. G. Churin and J. E. Midwinter in 42 *Electronics Letters*, 1307–1308 (Jul. 4, 1996)). However, these COADMS suffer from several problems. They have a high insertion loss, and, although multiple optical signals can be removed from the network, only one of these optical signals can actually be transmitted into an output fiber. Finally, the optical signal is mechanically selected in this type of COADM.

U.S. Pat. No. 5,414,540 of Patel et al. (Patel) discloses a COADM capable of individually switching optical signals in an input channel or an add channel to a selected one of a drop channel or an output channel. The optical signals have to have specific directions of polarization in some of Patel's embodiments. A diffraction grating spatially separates the optical signals in the input channel or the add channel according to their frequencies. The separated optical signals pass through different segments of a liquid-crystal modulator. The liquid-crystal modulator segments are individually controlled to rotate the polarization of the optical signal passing through them through zero or 90°. The optical signals then pass through a polarization-dispersive element, such as calcite, which spatially separates the optical signals according to their polarization. A second diffraction grating combines the optical signals having the same polarization state, i.e., rotated or not rotated, into two different, non-parallel output beams, one of which is transmitted to the output channel, the other of which passes to a drop channel.

The COADM disclosed by Patel offers a number of advantages over the optical multiplexer-based and slit-based COADMS mentioned above, but still has shortcomings. The structure of several of the embodiments disclosed by Patel causes them to suffer from an unacceptably high level of cross-talk. A COADM should not introduce cross-talk between the optical signals. When a COADM operates to drop an optical signal received at its input port, the cross-talk component of greatest concern is that between the input port and the output port. This is particularly important because it is customary for the network to include many COADMS connected in series. The cumulative effect of cross-talk into the output port in each COADM degrades the signal-to-noise ratio of the optical signals passing through the network. When a COADM operates to add an optical signal received at its add port, the cross-talk component of greatest concern is that between the add port and the drop port. These cross-talk components between the input port and the output port and between the add port and the drop port are typically coherent and in-band with the wanted signal. Worst-case calculations indicate that the specification for the cross-talk components from the add port to the drop port and from the input port and the output port should be less than −50 dB. That is, the power of the cross-talk optical signal divided by the power of the wanted optical signals at the output port or at the drop port should be less than $10^{-5}$. A good reference on the crosstalk performance of optical add-drop multiplexers is E. L. Goldstein and L. Eskildsen, *Scaling Limitations in Transparent Optical Networks Due to Low-level Crosstalk*, 7 IEEE Photonics Tech. Lett., 95–96 (January 1995).

First, in some of the embodiments disclosed by Patel, the optical signals are incident on the elements of the COADM, including the LC modulator, at angles of incidence that differ significantly from one another and that additionally are different from zero. The polarization rotation provided by the LC modulator depends on the angle of incidence. The polarization of an optical signal will be rotated through a design angle, e.g., 90°, only at a given angle of incidence. Optical signals having other angles of incidence have their polarization rotated through angles different from the design angle. A portion of an optical signal whose polarization is not rotated through the design angle will appear as cross-talk at the other output.

Second, some of the embodiments disclosed by Patel operate with polarized optical signals having a pre-determined direction of polarization. Signal losses occur if the optical signals have directions of polarization different from the pre-determined direction, as is commonly the case of optical signals in a network. Such signal losses are undesirable in a network.

Third, the polarization-independent embodiments disclosed by Patel employ four or six half waveplates. Half waveplates not only introduce chromatic dispersion that causes cross-talk, but also need to have very accurately matched optical thicknesses to prevent them from introducing additional cross-talk. The applicants have calculated that practical manufacturing tolerances in only one of the half waveplates can result in a cross-talk level as high as −33 dB, which is unacceptably high for many applications, as noted above. Moreover, the effect of dispersion increases this cross-talk level significantly.

Fourth, Patel discloses an embodiment that uses a Wollaston prism to make the angles of incidence on the LC modulator all equal, but this embodiment additionally requires six half-wave plates, whose difficulties are discussed above.

Finally, the embodiments disclosed by Patel sites polarization-dispersive elements adjacent the LC modulator where the optical signals have been divided into their frequency components. This requires that the polarization-dispersive elements be relatively large, and increases the size and manufacturing cost of the COADM.

Accordingly, what is needed is a configurable optical add-drop multiplexer in which the optical signals to be added or dropped are electrically selected and that easily meets the above-mentioned −50 dB cross-talk specification.

What is also needed is a configurable optical add-drop multiplexer capable of operating with unpolarized optical signals or optical signals having arbitrary directions of polarization.

SUMMARY OF THE INVENTION

The invention provides a frequency-selective optical multiplexer that comprises input/output optics, an LC polarization controller and a spectral demux/mux. The input/output optics include two ports, a first optical path and a second optical path spatially separated from one another by a first distance in a first direction, and polarization-dispersive optics.

The polarization dispersive optics are disposed between the ports and the optical paths, and are structured to generate a pair of polarization components from an optical signal. The pair of polarization components is composed of a first polarization component and a second polarization component having orthogonal directions of polarization. The polarization dispersive optics are additionally structured to output the first and second polarization components via the first and second optical paths, respectively. The first and second polarization components have first and second polarization directions when the optical signal is received at one of the ports, and have the second and the first polarization directions, respectively, when the optical signal is received at the other of the ports.

The spectral demux/mux generates, from a first pair of orthogonal polarization components received from the input/output optics, first pairs of spectral components spatially separated in a direction orthogonal to the first direction, outputs the first pairs of spectral components to the LC polarization controller, receives respective second pairs of spectral components from the LC polarization controller, and spatially overlaps the second pairs of spectral components to generate a second pair of polarization components for return to the input/output optics. Either the first pair of polarization components or the second pair of polarization components passes between the spectral demux/mux and the input/output optics via the optical paths.

The LC polarization controller is located to receive the first pairs of spectral components at a zero angle of incidence, and operates to rotate the polarizations of each of the first pairs of spectral components individually and selectively through an angle of either 0° or 90° to generate one of the second pairs of spectral components.

The invention additionally provides a method for dropping a drop optical signal from a multi-frequency optical signal. In the method, the multi-frequency optical signal is received and is spatially separated into a first polarization component and a second polarization component having orthogonal directions of polarization. The first polarization component and the second polarization component are spatially separated into first spectral components and second spectral components, respectively. The first spectral components and the second spectral components respectively include a first drop spectral component and a second drop spectral component originating from the drop optical signal.

The polarizations of the first drop spectral component and others of the first spectral components are set to be orthogonal to one another and the polarizations of the second drop spectral component and others of the second spectral components are set to be orthogonal to one another.

The first spectral components are spatially overlapped to generate a third polarization component that includes the first drop spectral component polarized orthogonally to the others of the first spectral components. The second spectral components are spatially overlapped to generate a fourth polarization component spatially separated from the third polarization component. The fourth polarization component includes the second drop spectral component polarized orthogonally to the others of the second spectral components.

Finally, the third polarization component and the fourth polarization component are polarization-dependently spatially overlapped to generate the drop optical signal from the first drop spectral component and the second drop spectral component.

The invention finally provides a method for adding an add optical signal to a first multi-frequency optical signal to generate a second multi-frequency optical signal that includes the add optical signal. In the method, the add optical signal and the multi-frequency optical signal are received. The first multi-frequency optical signal is spatially separated into a first polarization component and a second polarization component having orthogonal polarizations. The add optical signal is spatially separated into a third polarization component polarized orthogonally to the first polarization component and a fourth polarization component polarized orthogonally to the second polarization component. The first and third polarization components are output as a fifth polarization component and the second and fourth polarization components are output as a sixth polarization component.

The fifth polarization component and the sixth polarization component are spatially separated into first spectral components and second spectral components, respectively. The first spectral components and the second spectral components respectively include a first add spectral component and a second add spectral component originating from the add optical signal.

The polarizations of the first add spectral component and others of the first spectral components are set to be parallel to one another and the polarizations of the second add spectral component and others of the second spectral components are set to be parallel to one another.

The first spectral components, including the add spectral component, are spatially overlapped to generate a seventh polarization component and the second spectral components, including the second add spectral component, are spatially overlapped to generate an eighth polarization component spatially separated from the seventh polarization component.

Finally, ones of the first spectral components having the same polarization as the first add spectral component in the seventh polarization component and ones of the second spectral components having the same polarization as the second add spectral component in the eighth polarization component are polarization-dependently spatially overlapped to generate the second multi-frequency optical signal.

The COADM according to the invention and the optical signal drop and the optical signal add methods according to the invention enable optical signals to be selectively dropped from and added to a multi-frequency optical signal using a simple electrical control signal. The COADM and the methods perform a polarization-dependent spatial separation before performing a frequency-dependent spatial separation. This enables the crosstalk levels to meet the above-described crosstalk specification.

BRIEF DESCRIPTION OF THE DRAWINGS

The invention can be better understood with reference to the following drawings. The components in the drawings are not necessarily to scale, emphasis instead being placed on clearly illustrating the invention.

FIG. 1A is a schematic plan view of a first embodiment of a COADM according to the invention.

FIG. 1B is a schematic side view of the COADM shown in FIG. 1A and additionally shows the input optics deriving a pair of polarization components polarized in the y-direction and the z-direction from an optical signal received at the input port and outputting these polarization components to the optical output paths A and B, respectively, and the output optics receiving a pair of polarization components polarized in the y-direction and the z-direction from the optical input paths A' and B', respectively, and feeding an optical signal derived from these polarization components to the drop port.

FIG. 1C is a schematic side view showing the input optics deriving a pair of polarization components polarized in the z-direction and the y-direction from an optical signal received from the add port and outputting these polarization components to the optical output paths A and B, respectively.

FIG. 1D is a schematic side view showing the output optics receiving a pair of polarization components polarized in the z-direction and the y-direction from the optical input paths B' and A', respectively, and feeding an optical signal derived from these polarization components to the output port.

FIG. 1E is a schematic side view of a practical embodiment of the COADM shown in FIG. 1A.

FIG. 3A is a schematic side view of the COADM shown in FIG. 1A illustrating the operation of the COADM with channel I in its drop mode.

FIG. 3B is a schematic side view of the COADM shown in FIG. 1A illustrating the operation of the COADM with channel I in its pass mode.

FIG. 3C is a schematic side view of the COADM shown in FIG. 1A illustrating the operation of the COADM with channel I in its add mode.

FIG. 3D is a schematic side view of the COADM shown in FIG. 1A illustrating the operation of the COADM with channel I in its add-drop mode.

FIG. 5A is a schematic side view of the COADM shown in FIG. 4A illustrating the operation of the COADM with channel I in its drop mode.

FIG. 5B is a schematic side view of the COADM shown in FIG. 4A illustrating the operation of the COADM with channel I in its pass mode.

FIG. 5C is a schematic side view of the COADM shown in FIG. 5A illustrating the operation of the COADM with channel I in its add mode.

FIG. 5D is a schematic side view of the COADM shown in FIG. 5A illustrating the operation of the COADM with channel I in its add-drop mode.

FIG. 6A is a schematic top view of a third embodiment of an COADM according to the invention.

FIG. 6B is a schematic side view of the COADM shown FIG. 6A.

FIG. 6C is a schematic side view showing the input optics of the COADM shown in FIGS. 6A and 6B deriving a pair of polarization components polarized in the y-direction and the z-direction from an optical signal received at the input port and outputting these polarization components to the optical output paths A and B, respectively.

FIG. 6D is a schematic side view showing the input optics of the COADM shown in FIGS. 6A and 6B deriving a pair of polarization components polarized in the z-direction and the y-direction from an optical signal received at the add port and outputting these polarization components to the optical output paths A and B, respectively.

FIG. 6E is a schematic side view showing the output optics of the COADM shown in FIGS. 6A and 6B receiving a pair of polarization components polarized in the y-direction and the z-direction from the optical input paths A' and B', respectively, and feeding an optical signal derived from these polarization components to the drop port.

FIG. 6F is a schematic side view showing the output optics of the COADM shown in FIGS. 6A and 6B receiving a pair of polarization components polarized in the z-direction and the y-direction from the optical input paths A' and B', respectively, and feeding an optical signal derived from these polarization components to the output port.

DETAILED DESCRIPTION OF THE INVENTION

Figure 2A:
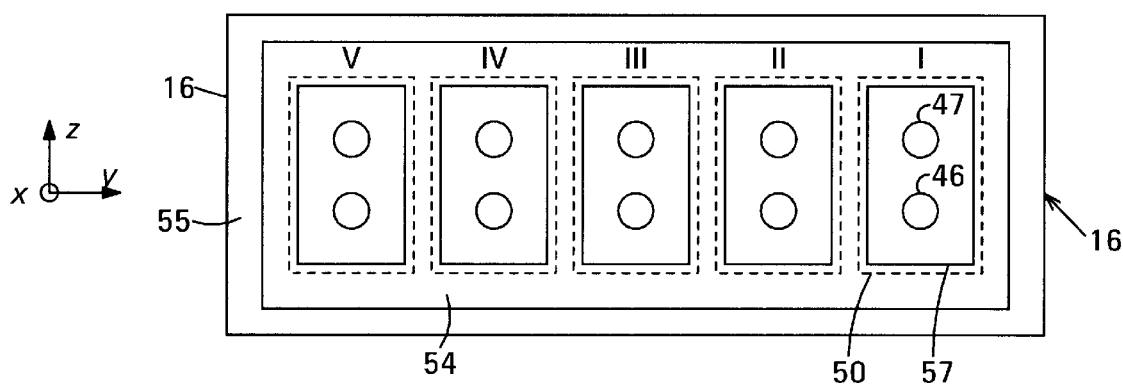
FIG. 2A is a schematic front view of the transmissive liquid crystal polarization controller of the COADM shown in FIG. 1A.

Referring now in more detail to the drawings, in which like numerals indicate corresponding parts throughout the several views, FIGS. 1A and 1B show the structure of a first embodiment 10 of a configurable optical add-drop multiplexer (COADM) according to the invention. Configurable optical add-drop multiplexers are sometimes referred to in the art as reconfigurable optical add-drop multiplexers (ROADMS). In this disclosure, the term configurable optical add-drop multiplexer (COADM) will be understood additionally to encompass a configurable optical add-only multiplexer and a configurable optical drop-only multiplexer.

The embodiments of the COADM according to the invention to be described in this disclosure operate with DWDM signals. Each DWDM signal is composed of at least one optical signal having a pre-determined frequency. When the DWDM signal is composed of more than one optical signal, each optical signal has a different optical frequency. The frequencies of the optical signals are normally standardized to provide interchangeability. The COADM according to the invention is configured to control a predetermined number of optical signals each having a different optical frequency, and will be said to control that number of channels. The COADM according to the invention can easily be adapted to operate on other multi-frequency optical signals.

Referring to FIG. 1A, the COADM 10 includes the input/output optics 11, the spectral demultiplexer/ multiplexer 19 (abbreviated as spectral demux/mux below) and the liquid crystal (liquid crystal is abbreviated as LC below) polarization controller 16.

The input/output optics include polarization-dispersive optics located between two ports, a first optical path and a second optical path. The first and second optical paths are spatially separated from one another by a predetermined distance in the z-direction. The polarization-dispersive optics are structured to generate from an optical signal a pair of polarization components composed of a first polarization component and a second polarization component having orthogonal directions of polarization, and to output the first and second polarization components via the first optical path and the second optical path, respectively. The first and second polarization components have a first direction of polarization and a second direction of polarization, respectively, when the optical signal is received at one of the ports, and have the second direction of polarization and the first direction of polarization, respectively, when the optical signal is received at the other of the ports.

In the embodiment 10 of the COADM shown in FIGS. 1A and 1B, the input/output optics 11 include two sets of polarization dispersive optics, namely, the polarization-dispersive input optics 12 and the polarization-dispersive output optics 13. The polarization-dispersive input optics 12 are located between the ports 36 and 38 and the first optical path A and the second optical path B. The optical paths A and B are spatially separated from one another by a predetermined distance in the z-direction. The input optics are structured to generate from an optical signal a pair of polarization components composed of the first polarization component 40 and the second polarization component 41 having orthogonal directions of polarization, and to output the polarization components 40 and 41 to the first optical path A and the second optical path B, respectively. The polarization components 40 and 41 are polarized in the y- and z-directions, respectively, when the optical signal is received from one of the ports, i.e., the port 36, and are polarized in the z- and y-directions, respectively, when the optical signal is received from the other of the ports, i.e., the port 38. These characteristics of the input optics are summarized in Table 1.

TABLE 1

| Port from which the optical signal is received | Polarization direction of polarization component in optical path indicated | |
|---|---|---|
| | polarization component 40 in optical path A | polarization component 41 in optical path B |
| Input (36) | y-direction | z-direction |
| Add (38) | z-direction | y-direction |

The input/output optics 11 additionally include the polarization-dispersive output optics 13 located between the ports 37 and 39 and the first optical path A' and the second optical path B'. The optical paths A' and B' are spatially separated from one another by the predetermined distance in the z-direction. The output optics receive, from the optical paths A' and B', the polarization components 42 and 43 having orthogonal directions of polarization, spatially overlap the polarization components to form an optical signal and direct the optical signal to the port 37 or the port 39. The optical signal is directed to the port 37 when the polarization components 42 and 43 are polarized in the y- and z-directions, respectively, and is directed to the port 39 when the polarization components 42 and 43 are polarized in the z- and y-directions, respectively. The characteristics of the output optics are summarized in Table 2.

TABLE 2

| Polarization direction of polarization component in optical path indicated | | Port to which |
| --- | --- | --- |
| polarization component 42 in optical path A' | polarization component 43 in optical path B' | optical signal is output |
| y-direction | z-direction | Drop (37) |
| z-direction | y-direction | Output (39) |

The person of ordinary skill in the art will realize that the above characteristics can be provided using output optics structured such that, if they were operated in reverse with the drop port 37 or the output port 39 receiving an optical signal, they would generate from such optical signal a pair of polarization components composed of a first polarization component and a second polarization component having orthogonal directions of polarization, and would output the polarization components to the first optical path A' and the second optical path B'. The first and second polarization components would be polarized in the y- and z-directions, respectively, when the optical signal was received from one of the ports, i.e., the port 37, and would be polarized in the z- and y-directions, respectively, when the optical signal was received from the other of the ports, i.e., the port 39.

The spectral demux/mux 19 generates, from the first pair of polarization components composed of the polarization components 40 and 41 received from the input/output optics 11 via the optical paths A and B, first pairs of spectral components spatially separated in the y-direction, i.e., a direction orthogonal to the z-direction in which the first polarization components are spatially separated. The spectral demux/mux outputs the first spectral components to the LC polarization controller 16, and additionally receives respective second spectral components from the LC polarization controller. The spectral demux/mux spatially overlaps the second pairs of spectral components to generate a second pair of polarization components composed of the polarization components 42 and 43 for return to the input/output optics 11 via the optical paths A' and B'. The polarization components 42 and 43 each include at least one pair of the second spectral components.

The LC polarization controller 16 is located to receive the first pairs of spectral components at a zero angle of incidence from the spectral demux/mux 19, and operates selectively and individually to rotate the polarization of the first pairs of spectral components through an angle of 0° or 90° to generate the respective second pairs of spectral components.

The pairs of spectral components have a zero angle of incidence on the LC polarization controller 16 relative to an appropriate axis of the LC material constituting the LC polarization controller. For example, the appropriate axis of the liquid crystal material of a VAN-mode (vertically-aligned nematic) LC modulator is the zero-field optic axis orientation of the LC material. In this disclosure, the term zero angle of incidence will be taken to encompass angles of incidence that differ from zero but at which the dispersion of the LC polarization controller, which depends on a number of factors including the angle of incidence, is not significantly larger than at an angle of incidence equal to zero.

Moreover, in this disclosure, the term angle of 0° or 90° will be taken to encompass an angle that differs from 0° or 90°, respectively, but at which the crosstalk of the COADM is not significantly larger than when the angle is equal to 0° or 90°, respectively. The crosstalk of the COADM depends on a number of factors including the angles through which the LC polarization controller rotates the polarizations of the spectral components.

In the embodiment shown in FIGS. 1A and 1B, the port 36 is designated as the input port through which a DWDM signal is received from the network and the port 38 is designated as the add port through which a DWDM signal is received from another network element. The port 37 is designated as the drop port 37 through which a DWDM signal is output to another network element and the port 39 is designated as the output port through which a DWDM signal is output to the network.

A channel of the COADM 10 in its drop mode receives an optical signal from the input port 36 and forwards the optical signal to the drop port 37. The channel its pass mode receives an optical signal from the input port and forwards the optical signal to the output port 39. The channel in its add mode receives an optical signal from the add port 38 and forwards the optical signal to the output port. The channel in the add-drop mode receives an optical signal from the add port and forwards the optical signal to the drop port.

Each channel of the COADM 10 operates individually and selectively in one of the four different operational modes just described to transfer optical signals forming part of DWDM signals received at either or both of the input port 36 and the add port 38 of the input optics 12 to form DWDM signals for output at either or both of the drop port 37 and the output port 38 of the output optics 13. The optical signal just described as being received at the input port 36 or the add port 38 may form part of a DWDM signal received at such port. In this case, the other optical signals constituting the DWDM signal are controlled by the other channels of the COADM. Similarly, the optical signal just described as being forwarded to the drop port 37 or the output port 39 may, together with other optical signals, form a DWDM signal output by such port. In this case, the other optical signals constituting the DWDM signal are controlled by the other channels of the COADM.

In this disclosure, an optical signal having an arbitrary or no defined direction of polarization is indicated by a solid line, a polarization component or spectral component polarized in the y-direction is indicated by a long-dash line and a polarization component or spectral component polarized in the z-direction is indicated by a short-dash line. An optical path along which a polarization component or spectral component polarized in one direction travels in one direction and along which a polarization component or spectral component polarized in the other direction travels reciprocally is indicated by a dot-dash line.

In the embodiment shown in FIGS. 1A and 1B, the spectral demux/mux 19 is composed of the spectral demultiplexer 14 and the spectral multiplexer 15 located back-to-back on the common optical axis 18. The spectral demultiplexer 14 receives the pair of polarization components 40 and 41 output by the input optics 12 via the optical output paths A and B and spatially separates the pair of polarization components in the y-direction into pairs of spectral components. FIG. 1A shows an example in which the pair of polarization components is separated into five pairs of spectral components. One half of each pair of spectral components is shown at 44 and hides the other half of the pair. The spectral components in each pair have the same optical frequency and orthogonal directions of polarization. The frequency corresponds to the frequency of optical signal constituting the DWDM signal from which the spectral components are derived. Thus, the spectral demultiplexer creates a two-dimensional array of the spectral components: pairs of spectral components are arrayed in the y-direction according to their frequency, as shown in FIG. 1A, and the spectral components in each pair are arrayed in the z-direction according to their polarization, as shown in FIG. 1B. This figure shows the pair of spectral components 46 and 47 derived from the channel I optical signal of the COADM 10. The spectral demultiplexer outputs the spectral components in a direction parallel to the optical paths A and B, i.e., parallel to the optical axis 18, towards the LC polarization controller 16. The LC polarization controller is aligned so that the spectral components are incident on it at an angle of incidence of zero, as described above.

FIG. 2A shows details of the LC polarization controller 16, which includes a control cell for each channel of the COADM 10. The control cell of channel I is indicated by the reference numeral 50. The pair of spectral components corresponding to each optical signal constituting the DWDM signal passes through a different one of the control cells of the LC polarization controller 16. Each control cell rotates the directions of polarization of the spectral components passing through it through an angle of 0° or 90°, depending on the state of an electrical control signal applied to it. The control signal determines the operational mode of the corresponding channel of the COADM, as will be described below with reference to FIGS. 3A–3D.

Returning now to FIGS. 1A and 1B, the spectral multiplexer 15 receives the pairs of spectral components from the LC polarization controller 16. One half of each pair of spectral components is shown at 45 and hides the other half of the pair. The spectral components travel parallel to the optical axis 18 as they enter the spectral multiplexer. The pairs of spectral components are spatially separated in the y-direction according to their frequencies, as shown in FIG. 1A and the spectral components constituting each pair are spatially separated in the z-direction according to their directions of polarization, as shown in FIG. 1B.

The spectral multiplexer 15 has characteristics complementary to those of the spectral demultiplexer 14, and reverses the spatial separation of the pairs of spectral components in the y-direction to generate the pair of polarization components 42 and 43. The spectral multiplexer outputs the pair of polarization components 42 and 43 parallel to the optical axis 18, spatially separated in the z-direction and aligned with the optical input paths A' and B', respectively, of the input/output optics 11.

In the input/output optics 11, the output optics 13 receive the polarization components 42 and 43 from the spectral multiplexer 14 via the optical input paths A' and B' and reverse the spatial separation of the polarization components in the z-direction. The optical paths A' and B' run parallel to the optical axis 18 and are spatially separated from one another in the z-direction by a distance equal to the separation of the optical paths A and B. The output optics direct a DWDM signal to either or both of the drop port 37 and the output port 39, depending on the polarizations of the spectral components constituting each of the polarization components. Each DWDM signal is obtained by overlaying the polarization components.

Each optical signal that constitutes the DWDM input signal received from the input port 36 becomes an optical signal in the DWDM drop signal output to the drop port 37 or in the DWDM output signal output to the output port 39, depending on whether or not the LC polarization controller 16 has rotated the directions of polarization of the spectral components derived from the optical signal. Similarly, each optical signal that constitutes the DWDM add signal received from the add port 38 becomes an optical signal in the DWDM output signal directed to the output port 39 or to the drop port 37, depending on whether or not the LC polarization controller rotated the directions of polarization of the spectral components derived from the optical signal. This will be described in full detail below.

Elements of the COADM 10 will now be described in more detail. In the example shown, the spectral demultiplexer 14 and the spectral multiplexer 15 are respectively composed of the frequency-dispersive devices 20 and 21 and the converging elements 22 and 23 in mirror-image arrangements. In the example shown, the converging elements 22 and 23 are convex lenses and the frequency-dispersive devices 20 and 21 are diffraction gratings.

The input optics 12 include the single polarization-dispersive device 28, the double polarization-dispersive device 30, the pick-off mirror 32 and the turning mirror 34 arranged as shown in FIG. 1B between the input port 36, the add port 38 and the optical output paths A and B. The mirrors 32 and 34 enable the input port and the add port to be aligned with the optical paths A and B, respectively. In the example shown, the pick-off mirror 32 and the turning mirror 34 are aligned substantially parallel to one another, and at 45° to the optical axis 18. Consequently, the input port and the add port are aligned at right angles to the optical axis. However, this is not critical to the invention, The mirrors 32 and 34 can be aligned at angles other than 45° to the optical axis 18 and need not be parallel to one another.

Each of the single and double polarization-dispersive devices 28 and 30 spatially separates light that passes through it into two polarization components having orthogonal directions of polarization. One polarization component, which will be called the ordinary polarization component, is polarized in the y-direction in the example shown and passes straight through the polarization-dispersive device. The other polarization component, which will be called the extra-ordinary polarization component, is polarized in the z-direction in the example shown and deviates laterally in the z-direction as it passes through the polarization-dispersive device. As a result, the ordinary and extraordinary polarization components emerge from each of the polarization-dispersive device parallel to one another, and spatially separated from one another. The direction in which the e-polarization component is separated from the o-polarization component by the single polarization-dispersive device 28 is opposite to that in which the e-polarization component is separated from the o-polarization component by the double polarization-dispersive device 30.

Moreover, in the output optics 13, orthogonally-polarized polarization components that enter one of the polarization-dispersive devices 29 and 31 parallel to one another, and laterally separated from one another by the appropriate distance in the appropriate separation direction emerge from the polarization-dispersive device spatially overlapped with one another. Polarization components separated in the direction opposite to the separation direction have their separation increased by passing through the polarization-dispersive device, however.

In an embodiment, the single and double polarization-dispersive devices 28 and 30 each preferably comprise a material having birefringent properties. Birefringent materials have different refractive indices for polarization components aligned parallel to and orthogonal to an optic axis intrinsic to the material. For example, the single and double polarization-dispersive devices may each comprise a walk-off crystal. In the embodiment shown, the optic axis of the single polarization-dispersive device 28 lies in the x-z plane and is oriented at 45° to the −z-direction so that the polarization component 41 polarized in the z-direction emerges from the single polarization-dispersive device laterally displaced in the −z-direction relative to the polarization component 40 polarized in the y-direction, as shown in FIG. 1B. The optic axis of the double polarization-dispersive device 30 lies in the x-z plane and is oriented at −45° to the +z-direction so that the polarization component 41 emerges from the double polarization-dispersive device laterally displaced in the +z-direction relative to the polarization component 40, as shown in FIG. 1C.

The lateral displacement between the polarization component 40 and the polarization component 41 as they emerge from the polarization-dispersive devices 28 and 30, called the walk-off distance in this disclosure, depends on the thickness and the material of the respective walk-off crystal. Crystals of rutile (titanium dioxide ($TiO_2$)) or yttrium vanadate ($YVO_4$) are suitable for the use as the polarization-dispersive devices. The latter was used in the preferred embodiment.

The double polarization-dispersive device 30 has a walk-off distance twice that of the single polarization-dispersive device 28 and is therefore twice as thick as the single polarization-dispersive device when both polarization-dispersive devices are made from the same material, as is preferred. The walk-off distance of the double polarization-dispersive device should be greater than the sum of the effective width of the pick-off mirror 32 in the y-direction, the beam widths of the polarization components and an alignment tolerance. Such walk-off distance allows the polarization components generated by the double polarization-dispersive device to pass on opposite sides of the pick-off mirror. Since it is preferable to minimize the walk-off distance of the double polarization-dispersive device, the effective width of the pick-off mirror in the y-direction is made as small as practically possible, taking into account fabrication constraints and the physical width of the DWDM signal reflected by the pick-off mirror.

In an embodiment, a glass, silica or single-crystal silicon substrate (not shown) having a gold reflective layer (not shown) on its major surface was used as the pick-off mirror 32. Defined in the substrate and the reflective layer were two circular apertures (not shown) each approximately 200 $\mu$m in diameter. The distance between the centers of the apertures was about 700 $\mu$m in the x-z plane. The portion of the reflective surface between the apertures constituted the pick-off mirror 32, and the polarization components generated by the double polarization-dispersive device 30 passed through the apertures.

In this disclosure, the single polarization-dispersive devices 28 and 29 will each be said to have a walk-off distance of one walk-off unit, and the double polarization-dispersive devices 30 and 31 will each be said to have a walk-off distance of two walk-off units.

In the input optics 12, the turning mirror 34, the double polarization-dispersive device 30, the pick-off mirror 32 and the single polarization-dispersive device 28 are arranged in order in the x-direction and are offset in the y-z plane from the optical axis 18. The reflection of the input port 36 in the pick-off mirror 32 defines the location of the optical output path A in the y-z plane. Optical output path B is offset from optical output path A in the −z-direction by the walk-off distance of the single polarization-dispersive device 28. The add port 38 is located in the y-z plane to align its reflection in the turning mirror 34 with the optical output path B. This physical arrangement enables the input optics to direct the polarization components 40 and 41 generated from the DWDM signals received from the input port and the add port to the optical paths A and B, respectively.

The output optics 13 include the single polarization-dispersive device 29, the pick-off mirror 33, the double polarization-dispersive device 31 and the turning mirror 35. These elements are identical to the single polarization-dispersive device 28, the double polarization-dispersive device 30, the pick-off mirror 32 and the turning mirror 34, respectively, of the input optics 12, and their arrangement is a mirror image in the y-z plane passing through the LC polarization controller 16 of the corresponding elements of the input optics. The single polarization-dispersive device 29 has a walk-off distance of one walk-off unit and the double polarization-dispersive device 31 has a walk-off distance of two walk-off units.

FIG. 1B shows how the input optics 12 derive the polarization components 40 and 41 for output to the optical output paths A and B, respectively, from a DWDM input signal received from the input port 36. The polarization component 40 is polarized in the y-direction and the polarization component 41 is polarized in the z-direction.

The pick-off mirror 32 reflects the DWDM input signal towards the single polarization-dispersive device 28. After reflection, the input signal is aligned with the optical path A. The single polarization-dispersive device 28 spatially separates the DWDM input signal into the ordinary polarization component o, polarized in the y-direction, and the extraordinary polarization component e, polarized in the z-direction. The o-polarization component passes through the single polarization-dispersive device without lateral displacement, and therefore enters the optical path A as the polarization component 40. The e-polarization component emerges from the single polarization-dispersive device 28 laterally displaced from the o-polarization component by one walk-off unit in the −z-direction and enters the optical path B as the polarization component 41.

FIG. 1C shows how the input optics 12 derive the polarization components 40 and 41 for output via the optical output paths A and B, respectively, from a DWDM add signal received from the add port 38. The polarization component 40 is polarized in the z-direction and the polarization component 41 is polarized in the y-direction.

The turning mirror 34 reflects the DWDM add signal towards the double polarization-dispersive device 30. After reflection, the add signal is aligned with the optical path B. The double polarization-dispersive device 30 spatially separates the DWDM add signal into the ordinary polarization component o, polarized in the y-direction, and the extraordinary polarization component e, polarized in the z-direction. The o-polarization component passes through the double polarization-dispersive device 30 without lateral displacement and is therefore aligned with the optical path B. The walk-off distance of the double polarization-dispersive device 30 is twice that of the single polarization-dispersive device 28. Hence, the o- and e-polarization components emerge from the double polarization-dispersive device laterally displaced from one another by two walk-off units in the z-direction.

The o- and e-polarization components pass on opposite sides of the pick-off mirror 32 to the single polarization-dispersive device 28. The o-polarization component passes through the single polarization-dispersive device 28 without lateral displacement, and, hence, enters the optical path B as the polarization component 41. The polarization component 41 is polarized in the y-direction. The single polarization-dispersive device laterally displaces the e-polarization component by one walk-off unit in the −z-direction. The e-polarization component emerges from the single polarization-dispersive device spatially separated from the o-polarization component by one walk-off unit in the +z-direction, and enters the optical path A as the polarization component 40. The polarization component 40 is polarized in the z-direction. Note that the polarization components 40 and 41 are separated by a distance equal to that of the polarization components 40 and 41 derived from the DWDM input signal shown in FIG. 1B, but have opposite polarizations.

The output optics 13 receive the pair of spatially-separated polarization components 42 and 43 from the spectral multiplexer 15 via the optical paths A' and B'. The output optics spatially overlap the polarization components to form a DWDM signal and directs the DWDM signal to one or both of the drop port 37 and the output port 39, as described above.

FIG. 1B shows how the output optics 13 spatially overlap the polarization component 42 polarized in the y-direction and received from the optical input path A' and the polarization component 43 polarized in the z-direction and received from the optical input path B' to form the DWDM drop signal $S_D$, and direct the DWDM drop signal to the drop port 37. The polarization components 42 and 43 enter the single polarization-dispersive device 29 from the optical input paths A' and B', respectively. The polarization component 42 passes through the single polarization-dispersive device 29 without being laterally displaced. The single polarization-dispersive device laterally displaces the polarization component 43 by one walk-off unit in the +z-direction. The single polarization-dispersive device 29 spatially overlaps the polarization components 42 and 43 to form the DWDM drop signal aligned with the reflection of the drop port 37 in the pick-off mirror 33. The pick-off mirror reflects the DWDM drop signal to the drop port.

FIG. 1D shows how the output optics 13 spatially overlap the polarization component 42 polarized in the z-direction and received from the optical input path A' and the polarization component 43 polarized in the y-direction and received from the optical input path B' to form the DWDM output signal $S_O$ and direct the DWDM output signal to the output port 39.

The polarization components 42 and 43 enter the single polarization-dispersive device 28 from the optical input paths A' and B', respectively. The polarization component 43 passes through the single polarization-dispersive device 29 without being laterally displaced. The single polarization-dispersive device laterally displaces the polarization component 42 by one walk-off unit in the +z-direction. As a result, the polarization component 42 emerges from the single polarization-dispersive device spatially separated from the polarization component 43 by two walk-off units in the +z-direction.

The polarization components 42 and 43 emerging from the single polarization-dispersive device 29 are disposed approximately symmetrically about the pick-off mirror 33, and therefore pass to the double polarization-dispersive device 31 on opposite sides of the pick-off mirror 33.

The double polarization-dispersive device 31 has twice the walk-off distance of the single polarization-dispersive device 29, and laterally displaces the polarization component 42 towards the polarization component 43 by two walk-off units in the −z-direction. Thus, the double polarization-dispersive device 31 spatially overlaps the polarization components 42 and 43 to form the DWDM output signal aligned with the reflection of the output port 39 in the turning mirror 35. The turning mirror reflects the DWDM output signal into the output port.

Figure 2B:
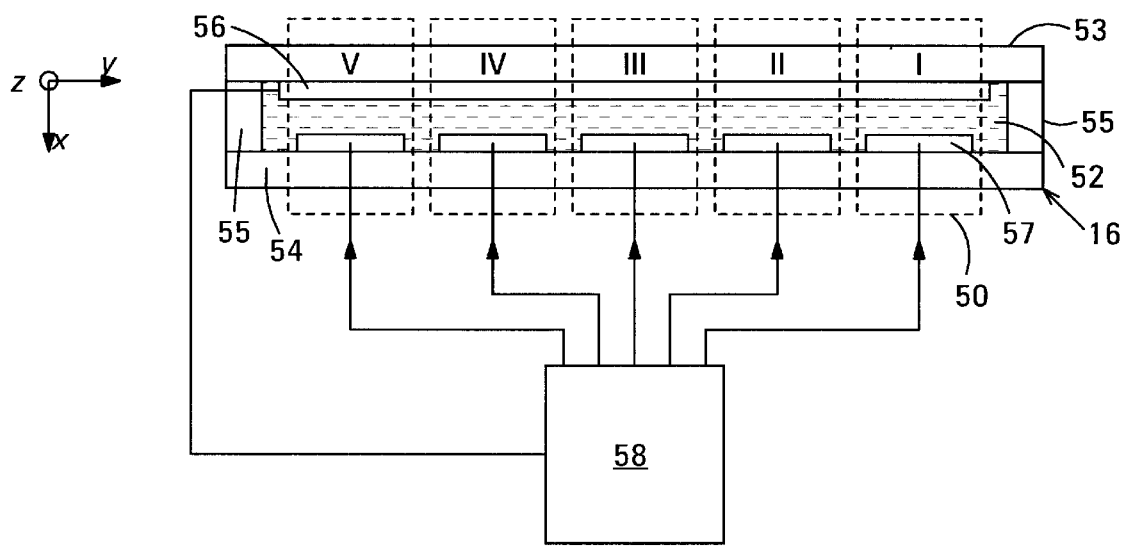
FIG. 2B is a schematic side view of the transmissive liquid crystal polarization controller shown in FIG. 2A.

FIGS. 2A and 2B show details of the liquid crystal (LC) polarization controller 16. In the embodiment of the COADM 10 shown in FIGS. 1A and 1B, the LC polarization controller is a transmissive LC polarization controller. The LC polarization controller comprises a control cell for each channel controlled by the COADM 10. Accordingly, in the five-channel example shown, the LC polarization controller comprises five control cells. The channel controlled by each control cell is indicated by a respective Roman numeral. Each control cell operates in response to an electrical control signal to rotate the directions of polarization of the pair of spectral components passing through it by an angle of 0° or 90°, depending on the state of the control signal. The control cell of channel I is shown at 50. Each control cell may optionally be divided into two sub-cells, each of which controls the direction of polarization of one spectral component, if desired, to reduce polarization-dependent loss.

The LC polarization controller 16 is composed of the layer 52 of liquid crystal material sandwiched between the transparent cover plates 53 and 54, which are separated from one another by the spacer 55. The cover plate 53 supports the common electrode 56, which is common to all the control cells. Alternatively, the common electrode may be segmented to provide an individual common electrode for each of the control cells. The cover plate 54 supports a control electrode for each of the control cells. The control electrode of the control cell 50 is shown at 57. The material of the common electrode and the control electrodes is a transparent, conductive material such as indium tin oxide (ITO).

The control cells are dimensioned, and the LC polarization controller 16 is aligned relative to the spectral demultiplexer 14 and the spectral multiplexer 15, such that the pair of spectral components derived from the optical signal in each channel passes exclusively through a different one of the control cells. For example, the channel I spectral components 46 and 47 pass exclusively through the control cell 50: the pairs of spectral components derived from the optical signals in channels II–V each pass through a different one of the remaining control cells.

The common electrode 56 and each of the control electrodes, including the control electrode 57 of the control cell 50, are electrically connected to the controller 58. The liquid crystal material of the layer 52 has an optic axis aligned relative to the LC polarization controller 16, and the LC polarization controller is aligned relative to the directions of polarization defined by the input optics 12, such that, when the control signal generated by the controller is in its 0 state, the pair of spectral components 46 and 47 passes through the control cell 50 with its directions of polarization rotated through an angle of 0°. When the control signal applied to the control electrode 57 is in its 0 state, the channel I optical signal of a DWDM input signal at the input port 36 is directed to the drop port 37 and the channel I optical signal of a DWDM add signal at the add port 38 is directed to the output port 39.

The controller 58 applying the control signal in its 1 state between the control electrode 57 and the common electrode 56 causes the control cell 50 to rotate the directions of polarization of the pair of spectral components 46 and 47 derived from the channel I optical signal through about 90°. The actual rotation depends on the wavelength of the spectral components. When the control signal applied to the control electrode 57 is in its 1 state, the channel I optical signal of a DWDM input signal at the input port 36 is directed to the output port 39 and the channel I optical signal of a DWDM add signal at the add port 38 is directed to the drop port 37.

The material of the liquid crystal layer 52 is preferably a nematic liquid crystal material. The strength of the electric field applied to the liquid crystal layer determines the angle through which the optic axis of the material of the liquid crystal layer is rotated. Thus, preferably, the voltage corresponding to the 1 state of the control signal is individually selected for each control cell in accordance with the wavelength of the pair of spectral components passing through the control cell. The voltage is chosen to cause the control cell to rotate the directions of polarization of the pair of spectral components passing through it by an angle close to 90° when the voltage is applied. This minimizes cross-talk in the corresponding channel of the COADM 10. In applications in which low cross-talk is less important, the controller 58 can be simplified by configuring it to apply the same voltage to the control electrodes of all the control cells in the 1 state of the control signal.

The controller 58 may be omitted from the COADM 10, and externally-supplied control signals may be applied between the control electrodes, e.g., 57, and the common electrode 56 to determine the operational mode of each channel of the COADM.

Operation of the above-described COADM 10 with channel I in its drop mode will now be described with reference to FIG. 3A. In the drop mode, the control signal in its 0 state applied to the control cell 50 of the LC polarization controller 16 causes the COADM to direct the channel I optical signal of the DWDM input signal $S_I$ received at the input port 36 to the drop port 37, where it becomes the channel I optical signal of the DWDM drop signal $S_D$. FIGS. 3A–3D show only the channel I optical signal of the DWDM input signal to simplify the drawings.

The input optics 12 derive the polarization components 40 and 41 from the DWDM input signal $S_I$. The polarization components 40 and 41 include the spectral components 46 and 47 derived from the channel I optical signal. Since the channel I optical signal from which the spectral components are derived is received via the input port 36, the spectral component 46 included in the polarization component 40 fed into the optical output path A is polarized in the y-direction and the spectral component 47 included in the polarization component 41 fed into the optical output path B is polarized in the z-direction, as described above with reference to FIG. 1B.

The polarization components 40 and 41 will include additional spectral components having the same directions of polarization as those shown if the DWDM input signal $S_I$ includes optical signals in channels additional to channel I. Moreover, the polarization components 40 and 41 will include additional spectral components polarized in directions orthogonal to those shown if a DWDM add signal is additionally present at the add port 38. Such additional spectral components do not change the operation of channel I and are therefore omitted from the figures to simplify the drawings.

The polarization components 40 and 41 enter the spectral demux/mux 19 (FIG. 1B) via the optical output paths A and B, respectively. The optical output paths are parallel to one another and to the optical axis 18, and are separated from one another by one walk-off unit in the z-direction.

In the spectral demux/mux 19 (FIG. 1B), the pair of polarization components 40 and 41 enters the spectral demultiplexer 14, where it passes through the converging element 22 to the frequency-dispersive device 20. The frequency-dispersive device 20 spatially separates the pair of polarization components 40 and 41 into pairs of its constituent spectral components in accordance with the frequencies of the spectral components. The spatial separation is made in the y-direction. FIG. 1A shows an example in which the polarization component 41 received via the optical path B is polarized exclusively in the z-direction, and is spatially separated into the five spectral components 44 all polarized in the z-direction. The five spectral components polarized in the y-direction and derived from the polarization component 40 are hidden by the spectral components 44. The side view of FIG. 3A shows the spatial separation in the z-direction between the channel I spectral components 46 and 47 and between the channel I spectral components 48 and 49 in the frequency-dispersed portion of the optical path that extends between the frequency-dispersive device 20 and the frequency-dispersive device 21.

It should be noted that FIG. 1A shows an operational mode in which the DWDM input signal includes an optical signal in each of the five channels shown. Consequently, all of the spectral components 44 have the same polarization. When the COADM 10 additionally or alternatively receives a DWDM add signal via the add port 38, those of the spectral components 44 derived from the DWDM add signal will be polarized orthogonally to those of the spectral components derived from the DWDM input signal.

The number of spectral components shown in FIG. 1A is merely an example. Practical COADMS may be configured to control more or fewer channels by providing the LC polarization controller with more or fewer control cells than the number shown, and by configuring the spectral demux/mux 19, the beam diameters and the control cell widths in the y-direction accordingly.

The frequency-dispersive device 20 directs the pairs of spectral components back through the converging element 22. After passing through the converging element 22, the spectral components in each pair travel parallel to one another and to the optical axis 18 towards the LC polarization controller 16, as shown in FIGS. 1A and 3A.

Each pair of spectral components is incident on a different one of the control cells of the LC polarization controller 16, as described above and shown in FIGS. 1A and 2A. FIG. 3A shows the channel I spectral components 46 and 47 of channel I incident on the control cell 50. In the drop mode, the spectral components 46 and 47 are polarized in the y- and z-directions, respectively, and the control signal applied to the control cell 50 is in its 0 state. Consequently, the control cell 50 rotates the directions of polarization of the channel I spectral components 46 and 47 through an angle of 0°. The control cell outputs the channel I spectral components 48 and 49 whose directions of polarization substantially unchanged relative to those of the spectral components 46 and 47, respectively. Thus, the spectral components 48 and 49 are polarized in the y- and z-directions, respectively, as shown in FIG. 3A.

The spectral components 48 and 49 pass from the LC polarization controller back to the spectral demux/mux 19 (FIG. 1B) and, in particular, to the spectral multiplexer 15. In the spectral multiplexer 15, the converging element 23 deflects the spectral components 48 and 49 towards the optical axis 18, as shown in FIGS. 1A and 3A. The spectral components are incident on the frequency-dispersive device 21, which spatially overlaps the spectral components to form a pair of polarization components composed of the polarization components 42 and 43. FIG. 1A shows the frequency-dispersive device spatially overlapping the spectral components 45, including the spectral component 49, to form the polarization component 43. The frequency-dispersive device additionally spatially overlaps the spectral components (not shown) that include the spectral component 48 to form the polarization component 42.

It should be noted that FIG. 1A shows an operational mode in which the spectral components 45 are all polarized in the z-direction. As a result, the polarization component 43 is also exclusively polarized in the z-direction. However, when the COADM 10 is operated to drop one or more selected channels and to pass the remaining channels, only the spectral components of the channels to be dropped will have the polarizations shown in FIG. 3A. The spectral components of the channels to be passed will have polarizations orthogonal to those shown, i.e., as shown in FIG. 3B. In such a mixed operating mode, the polarization component 42 will be composed of spectral components polarized both in the y-direction (drop channels) and the z-direction (pass channels) and the polarization component 43 will be composed of spectral components polarized both in the z-direction (drop channels) and the y-direction (pass channels). The polarization components 42 and 43 will also each be composed of spectral components of both directions when the COADM 10 receives DWDM signals at both the input port 36 and the add port 38.

The polarization components 42 and 43 pass through the converging element 23, which deflects them so that they leave the spectral demux/mux 19 (FIG. 1B) travelling parallel to one another and to the optical axis 18, spatially separated from one another by one walk-off unit in the z-direction and aligned with the optical input paths A' and B', respectively, of the output optics 13.

The polarization components 42 and 43 enter the output optics 13. The polarization component 42 that enters via the optical input path A' includes the spectral component 48 polarized in the y-direction (long-dash line) and the polarization component 43 that enters via the optical input path B' includes the spectral component 49 polarized in the z-direction (short-dash line). The output optics spatially overlap the spectral components 48 and 49 to regenerate the channel I optical signal aligned with the drop port 37, as described above with reference to FIG. 1B. This provides the channel I optical signal of the DWDM drop signal $S_D$.

Operation of the above-described COADM 10 with channel I in its pass mode will now be described with reference to FIG. 3B. In the pass mode, the control signal in its 1 state applied to the control cell 50 of the LC polarization controller 16 causes the COADM to direct the optical signal in channel I of the DWDM input signal $S_I$ received at the input port 36 to the output port 39, where it becomes the channel I optical signal of the DWDM output signal $S_O$.

The portion of the COADM 10 between the input port 36 and the output of the spectral demultiplexer 14 operates on the DWDM input signal $S_{IN}$ received from the input port 36 in a manner identical to that in which this portion operates in the drop mode. Operation of this portion will therefore not be described again here.

The spectral components collectively generated by the input optics 12 and the spectral demultiplexer 14, including the spectral components 46 and 47 derived from the channel I optical input signal and respectively polarized in the y- and z-directions, are output by the spectral demultiplexer 14 towards the LC polarization controller 16. The spectral components travel parallel to one another and to the optical axis 18. Each pair of spectral components impinges upon a different one of the control cells of the LC polarization controller, as described above, and as shown in FIG. 1A.

In the pass mode, the control signal applied to the control cell 50 of the LC polarization controller 16 is in its 1 state. This causes control cell 50 to rotate the direction of polarization of both channel I spectral components 46 and 47 through an angle of 90° as the spectral components pass through the control cell. FIG. 3B shows the channel I spectral component 46 incident on the LC polarization controller as a long-dash line and the channel I spectral component 48 output by the LC polarization controller as a short-dash line. FIG. 3B also shows the channel I spectral component 47 incident on the LC polarization controller as a short-dash line and the channel I spectral component 49 output by the LC polarization controller as a long-dash line to indicate the changed directions of polarization of the spectral components.

The spectral components including the spectral components 48 and 49 pass from the LC polarization controller to the spectral multiplexer 15 of the spectral demux/mux 19 (FIG. 1B). In the spectral multiplexer 15, the converging element 23 deflects the spectral components towards the optical axis 18 as they travel towards the frequency-dispersive device 22. The frequency-dispersive device spatially overlaps the spectral components that include the spectral component 48 to form the polarization component 42 and overlaps the spectral components 45 that include the spectral component 49 to form the polarization component 43. The polarization components 42 and 43 pass back through the converging element 23, as described above.

The converging element 23 deflects the polarization components 42 and 43 so that they are output from the spectral multiplexer 15 travelling parallel to one another and to the optical axis 18, spatially separated from one another by one walk-off unit in the –z-direction and aligned with the optical paths A' and B', respectively.

The polarization components 42 and 43 enter the output optics 13. The directions of polarization of the spectral components 48 and 49 have been rotated through an angle of 90° relative to those of the spectral components 46 and 47, respectively. Consequently, the polarization component 42 received via the optical input path A' includes the spectral component 48 polarized in the z-direction (short-dash line) and the polarization component 43 received via the optical input path B' includes the spectral component 49 polarized in the y-direction (long-dash line). The output optics spatially overlap the spectral components 48 and 49 to regenerate the channel I optical signal aligned with the output port 39, as described above with reference to FIG. 1D. This provides the channel I optical signal of the DWDM output signal $S_O$.

Operation of the above-described COADM 10 with channel I in its add mode will now be described with reference to FIG. 3C. In the add mode, the control signal in its 0 state applied to the control cell 50 of the LC polarization controller 16 causes the COADM to direct the channel I optical signal of the DWDM add signal $S_A$ received at the add port 38 to the output port 39, where it becomes the channel I optical signal of the DWDM output signal $S_O$.

The input optics 12 derive the polarization components 40 and 41 from the DWDM add signal $S_A$ received at the add port 38. The polarization components include the spectral components 46 and 47, respectively, derived from the channel I optical signal. Since the DWDM add signal $S_A$ from which the polarization components are derived is received from the add port 38, the spectral component 46 included in the polarization component 40 fed into the optical output path A is polarized in the z-direction and the spectral component 47 included in the polarization component 41 fed into the optical output path B is polarized in the y-direction, as described above with reference to FIG. 1C. Note that the directions of polarization of the spectral components fed into the optical output paths A and B are orthogonal to those of the spectral components derived from the DWDM input signal in the drop and pass modes.

The spectral demux/mux 19 (FIG. 1B) and the LC polarization controller 16 operate similarly to the way described above with reference to FIG. 3A (drop mode), differing only in that the spectral components 46 and 47 entering the spectral demultiplexer 14 from optical paths A and B of the input optics 12 are polarized in the z- and y-directions, respectively. The polarization components 42 and 43 emerging from the spectral multiplexer 15 are aligned with the optical input paths A' and B', respectively, of the output optics 13 and include the spectral components 48 and 49 whose directions of polarization are substantially unchanged relative to those of the spectral components 46 and 47, respectively.

The polarization components 42 and 43 enter the output optics 13. The polarization component 42 that enters via the optical input path A' includes the spectral component 48 polarized in the z-direction (short-dash line) and the polarization component 43 that enters via the optical input path A' includes the spectral component 49 polarized in the y-direction (long-dash line). The output optics spatially overlap the spectral components 48 and 49 to regenerate the channel I optical signal aligned with the output port 39, as described above with reference to FIG. 1D. This provides channel I optical signal of the DWDM output signal $S_O$.

Operation of the above-described COADM 10 with channel I in its add-drop mode will now be described with reference to FIG. 3D. In the add-drop mode, the control signal in its 1 state applied to the control cell 50 of the LC polarization controller 16 causes the COADM 10 to direct the channel I optical signal of the DWDM add signal $S_A$ received at the add port 38 to the drop port 37, where it becomes the channel I optical signal of the DWDM drop signal $S_D$.

Operation of the input optics 12 when the DWDM add signal $S_A$ is received at the add port 38 is described above with reference to FIG. 3C (add mode). The input optics feed the polarization components 40 and 41 to the spectral demux/mux 19 (FIG. 1B). The polarization component 40 fed into the optical output path A includes the spectral component 46 polarized in the z-direction and the polarization component 41 fed into the optical output path B includes the spectral component 47 polarized in the y-direction, as described above with reference to FIG. 1C.

The spectral demux/mux 19 (FIG. 1B) and the LC polarization controller 16 operate similarly to the way described above with reference to FIG. 3B (pass mode), differing only in that the spectral components 46 and 47 included in the polarization components 40 and 41 that enter the spectral demultiplexer 14 from optical paths B and A, respectively, of the input optics 12, are polarized in the z- and y-directions, respectively, as just described. The polarization components 42 and 42 emerging from the spectral multiplexer 15 are aligned with optical input paths A' and B', respectively, of the output optics and include the spectral components 48 and 49 polarized in the y- and z-directions, respectively.

The polarization components 42 and 43 enter the output optics 13. The polarization component 42 that enters via the optical path A' includes the spectral component 48 polarized in the y-direction (long-dash line). The polarization component 43 that enters via the optical input path B' includes the spectral component 49 polarized in the z-direction (short-dash line). The output optics spatially overlap the spectral components 48 and 49 to form the channel I optical signal aligned with the drop port 37, as described above with reference to FIG. 1B. This provides the channel I optical signal of the DWDM drop signal $S_D$.

In FIGS. 3A and 3C, the control signal applied to the control cell 50 of the LC polarization controller 16 is in its 0 state so that channel I of the COADM 10 is in its drop mode with respect to a DWDM input signal at the input port 36, and is in its add mode with respect to a DWDM add signal at the add port 38. It will be apparent to the person of ordinary skill in the art that if both the DWDM input signal and the DWDM add signal include a channel I optical signal, then the COADM will drop the channel I optical signal of the DWDM input signal and will add the channel I optical signal of the DWDM add signal.

In FIGS. 3B and 3D, the control signal applied to the control cell 50 of the LC polarization controller is in its 1 state so that channel I of the COADM is in its pass mode with respect to such DWDM input signal and is in its add-drop mode with respect to such DWDM add signal. It will be apparent to the person of ordinary skill in the art that if both the DWDM input signal and the DWDM add signal include a channel I optical signal, then the COADM will pass the channel I optical signal of the DWDM input signal and will drop the channel I optical signal of the DWDM add signal.

Operation of the embodiments of the COADM according to the invention are described in this disclosure with reference to channel I of the COADM as an example. The remaining channels of the COADM operate in a manner similar to, and independent of, that channel, except that the spectral components derived from the optical signal of the channel pass through a control cell of the LC polarization controller different from the control cell 50. Each channel of the COADM operates independently in accordance with the state of the control signal applied to the control cell corresponding to the channel and the DWDM signal or signals at the ports of the input optics.

The COADM 10 has been described with reference to an example in which the input/output optics 11 include four ports and that consequently has four operational modes. In variations on the COADM 10 shown in FIG. 1A, the input/output optics may be composed of three ports. A drop-only COADM, in which the control signal sets each channel to a pass mode or a drop mode, may be constructed by modifying the input optics 12 to have only an input port. In this case, the add port 38, the turning mirror 34 and the double polarization-dispersive device 30 are omitted. Similarly, an add-only COADM, in which the control signal sets each channel to a pass mode or an add mode, may be constructed by modifying the output optics 13 to have only an output port. In this case, the turning mirror 33 and the drop port 37 are omitted. Alternatively, the double polarization-dispersive device 30, the turning mirror 34 and the output port are omitted, the control logic is inverted and the drop port 37 is used as the output port.

In the simplified COADMS just described, both the input optics 12 and output optics 13 are structured to generate from a DWDM signal a first polarization component having a first direction of polarization and a second polarization component having a second direction of polarization, orthogonal to the first direction of polarization and to output the first and second polarization components via the first and second optical paths, respectively. However, in the add-only COADM, only the input optics are structured to output the first and second polarization components with the first and second polarization directions, respectively, when the DWDM signal is received at one of the two ports, and with the second and first polarization directions, respectively, when the DWDM signal is received at the other of the two ports. Moreover, in the drop-only COADM, only the output optics are structured to output the first and second polarization components with the first and second polarization directions, respectively, when the DWDM signal is received at one of the two ports, and with the second and first polarization directions, respectively, when the DWDM signal is received at the other of the two ports.

In further variations, the input port 36 and the add port 38 can be interchanged, as can the drop port 37 and the output port 39. The port designations shown provide a maximum isolation between the drop port and the output port. In the intended application of the COADM 10, it is important to ensure that the channel of the network formerly occupied by an optical signal dropped from the network by routing it to the drop port remains clear of remnants of the dropped optical signal. Such remnants would degrade the signal-to-noise ratio of any optical signals latter added to the channel.

The embodiments 60, 70 and 90 of the COADM to be described below can also be simplified and modified in ways similar to those described above.

The depictions of the COADM 10 according to the invention in FIGS. 1A and 1B are schematic in the sense that a number of optical elements involved in managing the optical signals, polarization components and the spectral components as they pass through the COADM have been omitted to simplify the drawings. FIG. 1E shows part of an embodiment of the COADM in which the optical elements referred to above are included.

In the embodiment shown in FIG. 1E, each of the input port 36 and the add port 38 is composed of an optical fibre 24 and a lens 25. The input optics 12 are oriented at 90° to the optical axis 18 of the spectral demultiplexer 14, and the double telecentric reimager 25 and the turning mirror 27 are interposed between the input optics and the spectral demultiplexer. The output optics 13 are similarly configured.

The lens 25 highly magnifies the optical signal output by the optical fibre 24 so that the optical signal output is incident on the polarization-dispersive device 28 or 30 in a highly-magnified state. Magnifying the light incident on the polarization-dispersive device reduces cross-talk between the polarization components generated from the optical signal as the polarization components pass through the polarization-dispersive device. The double telecentric reimager demagnifies the polarization components after they have passed through the polarization-dispersive device. Demagnifying the polarization components reduces the required sizes of the spectral demux/mux 19 (FIG. 1A) and the polarization controller 16 constituting the COADM 10 and therefore reduces the overall size of the COADM.

The double telecentric reimager additionally reverses the order of the optical paths A and B relative to the embodiment shown in FIGS. 1A and 1B. In the embodiment shown in FIG. 1E, the polarization component 40 output by the optical path A travels through the spectral demultiplexer 14 further from the optical axis 18 than the polarization component 41 output by the optical path B, whereas in the embodiment shown in FIG. 1B, the polarization component 40 travels closer to the optical axis than the polarization component 41.

Operation of the portion of the COADM shown in FIG. 1E will be described with reference to an example in which an optical signal is received at the input port 36. The add port 38 is similarly structured and operates similarly. The portion of the COADM between the LC polarization controller and the output and drop ports (not shown) is symmetrically structured and operates similarly. Only the o-polarization components that pass through the single polarization-dispersive device 28 and the double polarization-dispersive device 30 without lateral deviation are shown in FIG. 1E to simplify the drawing. The e-polarization components are omitted.

The lens 25 focuses the optical signal diverging from the end of the optical fibre 24 on the pick-off mirror 32. The telecentric re-imager re-focuses the polarization component derived from the optical signal diverging from the pick-off mirror 32 at the point P. The length of the optical path between the point P and the converging element 22 of the spectral demultiplexer 14 is equal to the distance of the LC polarization controller 16 from the converging element 22. The converging element 22 collimates the polarization component diverging from the point P, so that the polarization component travels to the frequency-dispersive device 20 as a parallel beam. The spectral components derived from the polarization component by the frequency-dispersive device return to the converging element as parallel beams. The converging element 22 focuses the spectral components on the respective control elements of the LC polarization modulator 16.

Figure 4A:
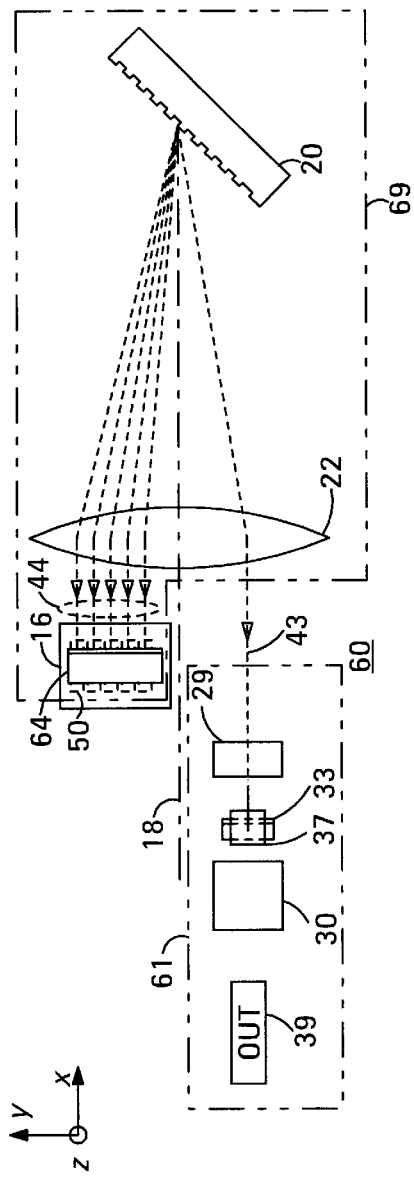
FIG. 4A is a schematic top view of a second embodiment of a COADM according to the invention.
Figure 4B:
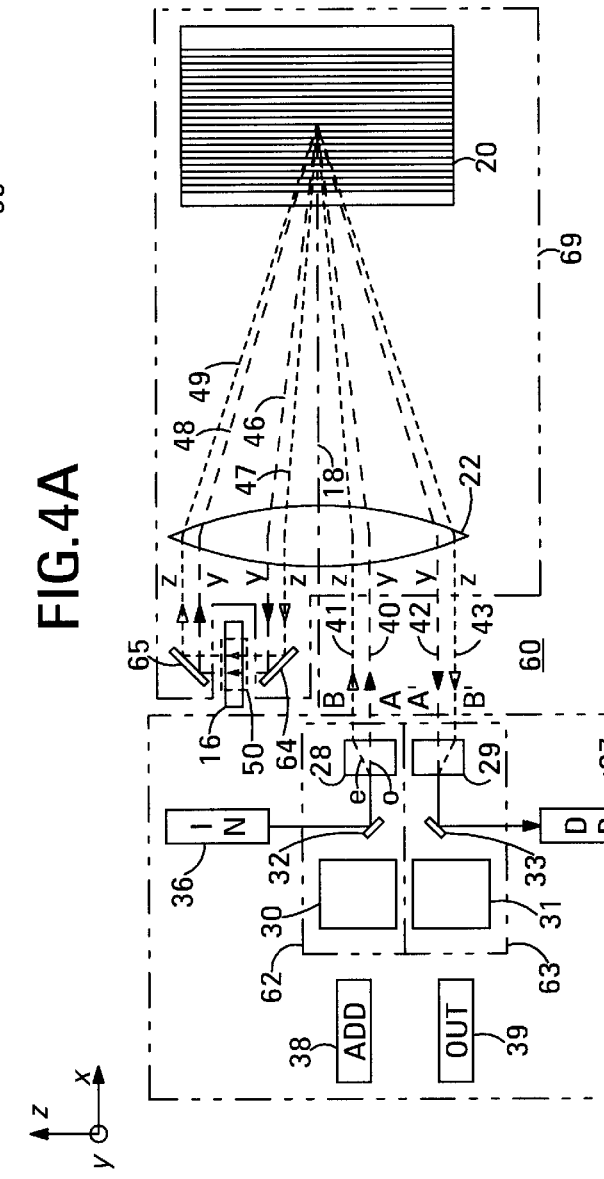
FIG. 4B is a schematic side view of the COADM shown FIG. 4A and additionally shows the input optics deriving a pair of polarization components polarized in the y-direction and the z-direction from an optical signal received from the input port and outputting these polarization components to the optical output paths A and B, respectively, and the output optics receiving a pair of polarization components polarized in the y-direction and the z-direction from the optical input paths A' and B', respectively, and feeding an optical signal derived from these polarization components to the drop port.

FIGS. 4A and 4B show a second embodiment 60 of a COADM A according to the invention. The COADM 60 is based on the COADM 10 shown in FIGS. 1A and 1B. However, the spectral demux/mux 69 is composed of only the single frequency-dispersive device 20, the converging element 22 and the turning mirrors 64 and 65 in a folded configuration. Such configuration enables the single frequency-dispersive device 20 both to spatially separate the polarization components into spectral components and to spatially overlap the spectral components to form polarization components. Accordingly, the COADM 60 is more compact and can be manufactured with fewer parts and with fewer alignment operations. Elements of the COADM 60 that correspond to elements of the COADM 10 are indicated using the same reference numerals and will not be described again here.

The input/output optics 61 are composed of the input optics 62 and the output optics 63 located adjacent one another in the z-direction. The output optics are a mirror image of the input optics in the x-z plane. Locating the input optics and the output optics next to one another in this manner enables the turning mirrors 34 and 35 shown in FIGS. 1A and 1B to be omitted and the add port 38 and the output port 39 to be directly aligned with the optical output path B and the optical input path B', respectively. Locating the input optics and the output optics next to one another in this manner additionally places the optical input paths A' and B' parallel to the optical output paths A and B but offset from the optical axis 18 in the y-z plane by different distances. The input optics 62 are otherwise identical in structure and function to the input optics 12 and will not be further described. The output optics 63 differ similarly from the output optics 13.

In the example shown, the offset of the add port 38 from the optical axis 18 in the y-z plane is greater than that of the output port 39 by an offset distance d.

In the spectral demux/mux 69, the turning mirrors 64 and 65 are shown angled at 135° and 45°, respectively, to the x-axis. The turning mirrors are located opposite one another and separated from one another in the y-z plane by a distance approximately equal to the above-mentioned offset distance d. The LC polarization controller 16 is located between the turning mirrors with its common electrode 56 (FIG. 2B) parallel to the x-y plane. Spectral components are output by the spectral demux/mux 69 travelling in the −x-direction but are reflected through substantially 90° by the turning mirror 64. Thus, the spectral demux/mux 69 outputs the spectral components in the z-direction. Accordingly, the spectral components pass through the LC polarization controller 16 with an angle of incidence of zero. After passing through the LC polarization controller, the spectral components travel in the z-direction to return to the spectral demux/mux and are reflected through substantially 90° by the turning mirror 65. After, reflection, the spectral components travel in the x-direction to re-enter the spectral demux/mux 69.

FIG. 4B shows the how the input optics 62 derive the polarization component 40 polarized in the y-direction and the polarization component 41 polarized in the z-direction from a DWDM input signal received from the input port 36 and direct these polarization components to the optical paths A and B, respectively in a manner similar to the input optics 12 described above with reference to FIG. 1B.

Figure 4C:
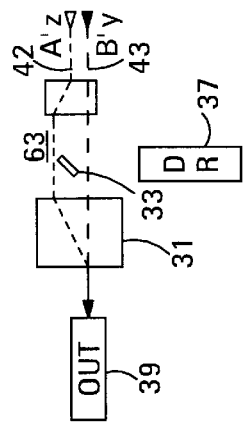
FIG. 4C is a schematic side view showing the input optics of the COADM shown in FIGS. 4A and 4B deriving a pair of polarization components polarized in the z-direction and the y-direction from an optical signal received from the add port and outputting these polarization components to the optical output paths A and B, respectively.

FIG. 4C shows how the input optics 62 derive the polarization component 40 polarized in the z-direction and the polarization component 41 polarized in the y-direction from a DWDM add signal received from the add port 38 and direct these polarization components to the optical paths A and B, respectively, in a manner similar to the input optics 12 described above with reference to FIG. 1C. The spatial separation of the polarization components derived from the DWDM add signal is equal and opposite to that of the polarization components derived from the DWDM input signal.

FIG. 4B shows how the output optics 63 derive a DWDM drop signal from the polarization component 42 received via the optical path A' and polarized in the y-direction and the polarization component 43 received via the optical path B' and polarized in the z-direction, and direct the drop signal to the drop port 37 in a manner similar to the output optics 13 described above with reference to FIG. 1B.

Figure 4D:
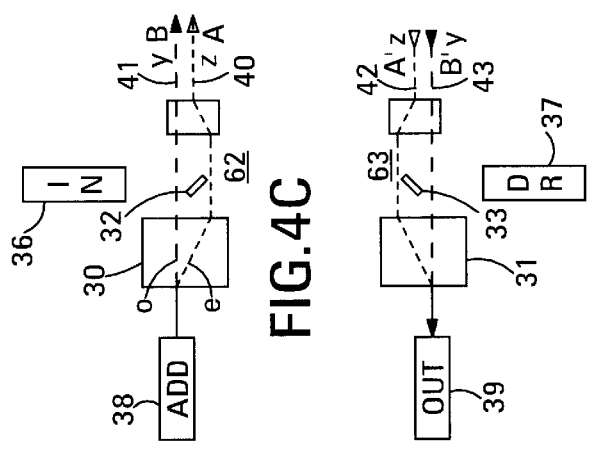
FIG. 4D is a schematic side view showing the output optics of the COADM shown in FIGS. 4A and 4B receiving a pair of polarization components polarized in the z-direction and the y-direction from the optical input paths A' and B', respectively, and feeding an optical signal derived from these polarization components to the output port.

FIG. 4D shows how the output optics 63 derive the DWDM output signal $S_O$ from the polarization component 42 received via the optical path A' and polarized in the z-direction and the polarization component 43 received via the optical path B' and polarized in the y-direction, and direct the output signal to the output port 39 in a manner similar to the output optics 13 described above with reference to FIG. 1D.

Operation of the above-described COADM 60 with channel I in its drop mode will now be briefly described with reference to FIG. 5A. Further operational details may be found above in the description of FIG. 3A.

The input optics 62 derive the polarization components 40 and 41 from the DWDM input signal $S_I$ received from the input port 36. The polarization components include the spectral components 46 and 47 derived from the channel I optical signal. Since the channel I optical signal from which the spectral components are derived is received via the input port 36, the spectral component 46 in the polarization component 40 fed into the optical output path A is polarized in the y-direction and the spectral component 47 in the polarization component 41 fed into the optical output path B is polarized in the z-direction, as described above with reference to FIG. 4B.

The polarization components 40 and 41 enter the spectral demux/mux 69 (FIG. 4B) via the optical paths A and B, respectively. The optical paths are parallel to one another and to the optical axis 18, and are separated from one another by one walk-off unit in the z-direction.

In the spectral demux/mux 69, the converging element 22 directs the polarization components to the frequency-dispersive device 20. The input optics are relatively close to the optical axis 18. Consequently, the polarization components are incident on the frequency-dispersive device with a relatively small angle of incidence component in the x-z-plane. The frequency-dispersive device spatially separates the pair of polarization components 40 and 41 in the y-direction to generate respective pairs of spectral components, as described above. The spectral components are spatially separated in accordance with their frequencies. FIG. 4A shows an example in which the polarization component 41 (hidden by the polarization component 43) is spatially separated into the five spectral components 44. The five spectral components derived from the polarization component 40 (also hidden by the polarization component 43) are hidden by the spectral components shown 44. Practical COADMS may be configured to control more or fewer than the five channels shown for illustration by providing the LC polarization controller with more or fewer control cells than the number shown. The side view of FIG. 5A shows the spatial separation in the z-direction between the channel I spectral components 46 and 47 and between the channel I spectral components 48 and 49 in the frequency-dispersed portion of the optical path that extends from the frequency-dispersive device 20, through the LC polarization controller 16 and back to the frequency-dispersive device.

The frequency-dispersive device 20 directs the spatially-separated spectral components back through the converging element 22. In the x-z-plane, the component of the angle of reflection of the spectral components generated by the frequency-dispersive device is equal to the component of the angle of incidence of the polarization components received from the input optics 62. The converging element 22 deflects the spectral components so that they travel parallel to the x-axis and are separated from the optical axis 18 by a distance approximately equal to the separation of the add port 38 from the same axis. The turning mirror 64 is located to intercept the spectral components and to reflect them through substantially 90° so that they pass through the LC polarization controller 16 with an angle of incidence of zero.

Each pair of spectral components passes through a different one of the control cells of the LC polarization controller, as described above and shown in FIGS. 2A and 4A. FIG. 5A shows the channel I spectral components 46 and 47, polarized in the y- and z-directions, respectively, incident on the control cell 50. In the drop mode, the control signal applied to the control cell 50 is in its 0 state. Consequently, the control cell 50 rotates the directions of polarization of the spectral components 46 and 47 through an angle of 0°. The control cell outputs the channel I spectral components 48 and 49 whose directions of polarization are substantially unchanged relative to those of the spectral components 46 and 47, respectively. The spectral components 48 and 49 are polarized in the y- and z-directions, respectively, as shown in FIG. 5A.

The spectral components 48 and 49 pass from the LC polarization controller 16 to the second turning mirror 65. The second turning mirror reflects the spectral components through substantially 90° so that spectral components once more travel parallel to the x-axis back towards spectral demux/mux 69. The spectral components are separated from the optical axis 18 by a distance equal to that of the pick-off mirror 33 from the same axis.

In the spectral demux/mux 69, the converging element 22 directs the spectral components to the frequency-dispersive device 20. In the x-z-plane, the spectral components received from the LC polarization controller 16 are incident on the frequency-dispersive device with an angle of incidence component greater than that of the polarization components received from the input optics 62.

The frequency-dispersive device 20 spatially overlaps the pairs of spectral components to form a pair of polarization components composed of the polarization components 42 and 43. The polarization component 43 is spatially separated from the polarization component 42 in the −z-direction, as shown in FIG. 5A. The polarization components are generated with an angle of reflection whose component in the x-z-plane is equal to that of the angle of incidence of the spectral components on the frequency-dispersive device. Accordingly, after deflection by the converging element 22, the polarization components 42 and 43 are output by the spectral demux/mux 69 travelling parallel to the x-axis, separated from one another by one walk-off unit in the z-direction and separated from the optical axis 18 by a distance equal to the separation of the output port 39 from the optical axis. The polarization components 42 and 43 are therefore aligned with the optical input paths A' and B', respectively, of the output optics 63.

The polarization components 42 and 43 enter the output optics 63. The polarization component 42 that enters via optical input path A' includes the spectral component 48 polarized in the y-direction and the polarization component 43 that enters via optical input path B' includes the spectral component 49 polarized in the z-direction. The output optics spatially overlap the spectral components 48 and 49 to form the channel I optical signal of the DWDM drop signal $S_D$ and direct this signal to the drop port 37, as described above with reference to FIG. 4B.

FIGS. 5B, 5C and 5D show the operation of the COADM 60 with channel I in its pass, add and add-drop modes respectively. Operation of the COADM 60 with channel I in these modes is similar to the operation of the COADM 10 with channel I in these modes, described above with reference to FIGS. 3B, 3C and 3D, respectively. Accordingly, FIGS. 5B, 5C and 5D only be described briefly.

In FIG. 5B (pass mode), the input optics 62 receive the DWDM input signal $S_I$ that includes the channel I optical signal from the input port 36. Consequently, the polarization component 40 fed into the optical path A includes the spectral component 46 derived from the channel I optical signal and polarized in the y-direction, and the polarization component 41 fed into the optical path B includes the spectral component 47 derived from the channel I optical signal and polarized in the z-direction, as described above with reference to FIG. 4B.

In the pass mode, the control cell 50 rotates the directions of polarization of the spectral components 46 and 47 through an angle of 90° so the polarization components 42 and 43 entering the optical paths A' and B' of the output optics 63 from the spectral demux/mux 69 include the spectral components 48 and 49 polarized in the z- and y-directions, respectively. The output optics spatially overlap the spectral components 48 and 49 to form the channel I optical signal of the DWDM output signal SO and direct this signal to the output port 39, as described above with reference to FIG. 4D.

In FIG. 5C (add mode), the input optics 62 receive the DWDM add signal $S_A$ that includes the channel I optical signal from the add port 38. Consequently, the polarization component 40 fed into the optical path A includes the polarization components 46 derived from the channel I optical signal and polarized in the z-direction, and the polarization component 41 fed into the optical path B includes the polarization component 47 derived from the channel I optical signal and polarized in the y-direction, as described above with reference to FIG. 4C.

In the add mode, the control cell 50 rotates the directions of polarization of the spectral components 46 and 47 through an angle of 0°, so the polarization components 42 and 43 entering the optical paths A' and B', respectively, of the output optics 63 from the spectral demux/mux 69 include the spectral components 48 and 49 polarized in the z- and y-directions, respectively. The output optics spatially overlap the spectral components 48 and 49 to form the channel I optical signal of the DWDM output signal $S_O$ and direct this signal to the output port 39, as described above with reference to FIG. 4D.

In FIG. 5D (add-drop mode), the input optics 62 receive the DWDM add signal $S_A$ that includes the channel I optical signal from the add port 38. Consequently, the polarization component 40 fed into the optical path A includes the polarization components 46 derived from the channel I optical signal and polarized in the z-direction, and the polarization component 41 fed into the optical path B includes the polarization component 47 derived from the channel I optical signal and polarized in the y-direction, as described above with reference to FIG. 4C.

In the add-drop mode, the control cell 50 rotates the directions of polarization of the spectral components 46 and 47 through an angle of 90° so the polarization components 42 and 43 entering the optical paths A' and B' of the output optics 63 from the spectral demux/mux 69 include the spectral components 48 and 49 polarized in the y- and z-directions, respectively. The output optics spatially overlap the spectral components 48 and 49 to form the channel I optical signal of the DWDM drop signal $S_D$ and direct this signal to the drop port 37, as described above with reference to FIG. 4B.

FIGS. 6A and 6B show a third embodiment 70 of a COADM according to the invention. The COADM 70 is based on the COADM 10 shown in FIGS. 1A and 1B. However, the COADM 70 uses a folded configuration incorporating the reflective LC polarization controller 76 and the spectral demux/mux 79 is composed only of the single frequency-dispersive device 20 and the converging element 22. Elements of the COADM 70 that correspond to elements of the COADM 10 are indicated using the same reference numerals and will not be described again here.

In the COADM 70, the reflective LC polarization controller 76 is operated with an angle of incidence of zero on its reflective control electrodes, to be described below. Consequently, light reflected by the reflective LC polarization controller travels back along the same path as light incident on the reflective LC polarization controller. As a result, the optical output paths A and B coincide with the output input paths A' and B', respectively. The reciprocal light paths allow the input/output optics 71 to be simplified and to consist of only the polarization-dispersive optics 72, composed of the single polarization-dispersive device 28, the double polarization-dispersive device 30 and the pick-off mirror 32, the three-port circulator 74, the three-port circulator 75 and the ports 36–39. The three-port circulators 74 and 75 separate the light reflected by the LC polarization controller 76 from the light received from the input port 36 and the add port 38.

The reflective LC polarization controller 76 is similar to the transmissive LC polarization controller 16 shown in FIGS. 2A and 2B, but differs in that the control electrodes, such as the control electrode 57, are reflective. Additionally, the cover plate 54 may be opaque. In an embodiment, a silicon die is used as the cover plate 54. Electronic circuits for driving the control electrodes may be formed in and on the portions of the silicon die underneath the control electrodes using conventional semiconductor fabrication processes. In the embodiments employing the transmissive LC polarization modulator 16, a silicon die in which the driving circuits are fabricated may be mounted on the cover plate 54 (FIG. 2B).

The polarization-dispersive optics 72 are composed of the single polarization-dispersive device 28, the pick-off mirror 32 and the double polarization-dispersive device 30 arranged in order in the direction of the −x-axis. Continuing the order of elements in the direction of the −x-axis is the circulator 75, which includes the output port 39, the add port 38 and the input/output (I/O) port 77 in clockwise order. The I/O port 77 is parallel to the x-axis.

The pick-off mirror 32 is shown aligned at 45° to the x-axis. However, this is not critical to the invention. The pick-off mirror may be aligned at an angle different from 45° to the optical axis. The circulator 74 is offset in the −y-direction from the pick-off mirror. The circulator 74 includes the drop port 37, the input port 36 and the I/O port 78 in counterclockwise order. The I/O port 78 is aligned parallel to the y-axis.

The reflection of the I/O port 78 in the pick-off mirror 32 defines the location of the optical paths A and A' in the y-z plane. The optical paths B and B' are offset from the optical paths A and A' by one walk-off unit in the −z-direction. The I/O port 77 of the circulator 75 is aligned with the optical paths B and B'.

In the y-z plane, the reflective LC polarization controller 76 and the optical paths A and B of the input-output optics 71 are symmetrically disposed about the optical axis 18 of the spectral demux/mux 79.

FIG. 6C shows the how the input/output optics 71 derive a pair of polarization components composed of the polarization component 40 polarized in the y-direction and the polarization component 41 polarized in the z-direction from a DWDM input signal received at the input port 36, and direct the polarization components to the optical paths A and B, respectively. The circulator 75, the double polarization-dispersive device 30 and the light reflected by the LC polarization controller 76 have been omitted from FIG. 6C to simplify the drawing. The DWDM input signal passes from the input port 36 counterclockwise through the circulator 74 and is output from the I/O port 78 towards the pick-off mirror 32. The pick-off mirror and the single polarization-dispersive device 28 then operate in the manner described above with reference to FIG. 1B.

FIG. 6D shows how the input/output optics 71 derive a pair of polarization components composed of the polarization component 40 polarized in the z-direction and the polarization component 41 polarized in the y-direction from a DWDM add signal received at the add port 38 and direct these polarization components to the optical paths A and B, respectively. The circulator 74 and the light reflected by the LC polarization controller 76 have been omitted from FIG. 6D to simplify the drawing. The DWDM add signal passes clockwise through the circulator 75 and is output from the I/O port 77 towards the double polarization-dispersive device 30. The double polarization-dispersive device and single polarization-dispersive device 28 the operate in the manner similar described above with reference to FIG. 1C. The spatial separation of the polarization components derived from the DWDM add signal is equal and opposite to that of the polarization components derived from the DWDM input signal.

FIG. 6E shows how the input/output optics 71 derive a DWDM drop signal from a pair of polarization components composed of the polarization component 42 polarized in the y-direction and the polarization component 43 polarized in the z-direction received from the optical paths A' and B', respectively, and direct the DWDM drop signal to the drop port 37. The circulator 75, the double polarization-dispersive device 30 and light received from the input port 36 or the add port 38 have been omitted from FIG. 6E to simplify the drawing. The single polarization-dispersive device 28 and the pick-off mirror 32 operate in the manner described above with reference to FIG. 1B to generate from the polarization components the DWDM drop signal aligned with the pick-off mirror 32. The DWDM drop signal is reflected by the pick-off mirror towards the I/O port 78 of the circulator 74. After entering through the I/O port 78, the DWDM drop signal passes counterclockwise through the circulator 74 and is output from the drop port 37.

FIG. 6F shows how the input/output optics 71 derive a DWDM output signal from a pair of polarization components composed of the polarization component 42 polarized in the z-direction and the polarization component 43 polarized in the y-direction received from the optical paths A' and B', respectively, and direct the DWDM output signal to the output port 39. The circulator 74 and light received from the input port 36 or the add port 38 have been omitted from FIG. 6F to simplify the drawing. The single polarization-dispersive device 28 and the double polarization-dispersive device 30 operate in the manner similar described above with reference to FIG. 1D to generate from the polarization components the DWDM output signal aligned with the I/O port 77 of the circulator 75. The DWDM output signal enters the circulator 75 through the I/O port 77, passes clockwise through the circulator 75 and is output from the output port 39.

Figure 7A:
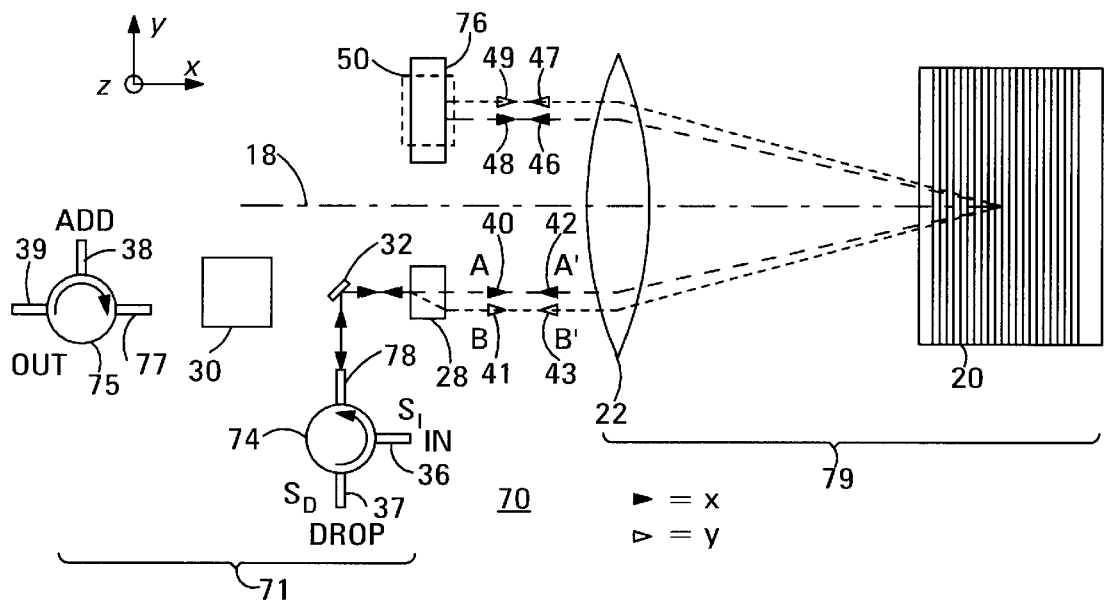
FIG. 7A is a schematic side view of the COADM shown in FIG. 6A illustrating the operation of the COADM with channel I in its drop mode.

Operation the above-described COADM 70 with channel I in its drop mode will now be briefly described with reference to FIG. 7A. Further operational details may be found above in the description of FIG. 3A.

The input/output optics 71 derive the polarization components 40 and 41 from the DWDM input signal $S_I$ received at the input port 36 as described above with reference to FIG. 6C. The polarization components include the channel I spectral components 46 and 47 derived from the channel I optical signal. Since the channel I optical signal from which the spectral components are derived is received via the input port 36, the spectral component 46 in the polarization component 40 fed into the optical output path A is polarized in the y-direction and the spectral component 47 in the polarization component 41 fed into the output path B is polarized in the z-direction, as described above.

Arrows indicate the direction and the polarization states of the polarization components and spectral components, collectively, components, at various points in the COADM 70. A solid arrow indicates polarization in the y-direction. A hollow arrow indicates polarization in the z-direction. For example, the polarization component 40, polarized in the y-direction, and the polarization component 41, polarized in the z-direction, output by the single polarization-dispersive device 28 are indicated by a hollow arrow and a solid arrow, respectively. Moreover, the direction of polarization of a component whose direction of polarization is rotated by the LC polarization controller 76 through an angle of 0° is indicated using the long-dash line/short-dash line convention described above. A component whose direction of polarization is changed by the reflective LC polarization controller is indicated by a dot-dash line.

The polarization components 40 and 41 enter the spectral demux/mux 79 via the optical paths A and B, respectively. The optical paths are parallel to one another and to the optical axis 18, and are separated from one another by one walk-off unit in the z-direction.

The spectral demux/mux 79 operates as described above with reference to FIG. 3A to generate spectral components, spatially separated in the y-direction, from the polarization components, and to output the spectral components parallel to the optical axis 18, as shown in the top view of FIG. 6A. The side view of FIG. 7A shows the spatial separation in the z-direction between the channel I spectral components 46 and 47 and between the channel I spectral components 48 and 49 in the frequency-dispersed portion of the optical path from the frequency-dispersive device 20, through the LC polarization controller 16 and back to the frequency-dispersive device.

The spectral demux/mux 79 outputs the spectral components 44 parallel to, and separated from, the optical axis 18 by a distance approximately equal to the separation of the circulator 75 from the same axis. The reflective LC polarization controller 76 is located to intercept the spectral components, which are incident on the reflective LC polarization controller 76 with an angle of incidence of zero.

Each pair of spectral components is incident on a different one of the control cells of the reflective LC polarization controller 76, as described above and shown in FIG. 6A. FIG. 7A shows the channel I spectral components 46 and 47, polarized in the y- and z-directions, respectively, incident on the control cell 50. In the drop mode, the control signal applied to the control cell 50 is in its 0 state. Consequently, the spectral components 46 and 47 are reflected by the control cell 50 with their directions of polarization rotated through an angle of 0°, and are output as the channel I spectral components 48 and 49 polarized in the y- and z-directions, respectively, as shown in FIG. 7A.

The reflective LC polarization controller 76 reflects the spectral components back towards the spectral demux/mux 79 along the same path as that from which they were output by the spectral demux/mux. The spectral demux/mux operates as described above to spatially overlap the pairs of spectral components to form a pair of polarization components composed of the polarization components 42 and 43. The polarization components travel parallel to the x-axis, separated from one another by one walk-off unit in the z-direction and aligned with the optical input paths A' and B', respectively, of the input/output optics 71.

The polarization components 42 and 43 enter the input/output optics 71. The polarization component 42 that enters via optical input path A' includes the spectral component 48 polarized in the y-direction and the polarization component 43 that enters via optical input path B' includes the spectral component 49 polarized in the z-direction. Consequently, the input/output optics spatially overlap the spectral components 48 and 49 to form the channel I optical signal of the DWDM drop signal $S_D$ and direct this signal to the drop port 37, as described above with reference to FIG. 6E.

Figure 7B:
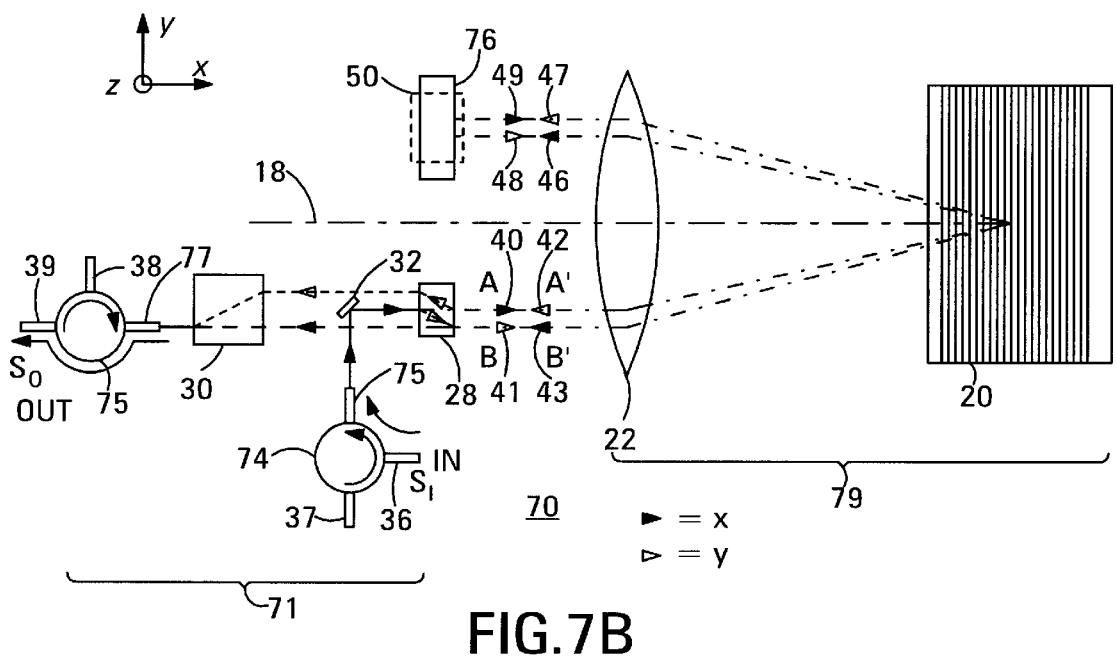
FIG. 7B is a schematic side view of the COADM shown in FIG. 6A illustrating the operation of the COADM with channel I in its pass mode.
Figure 7C:
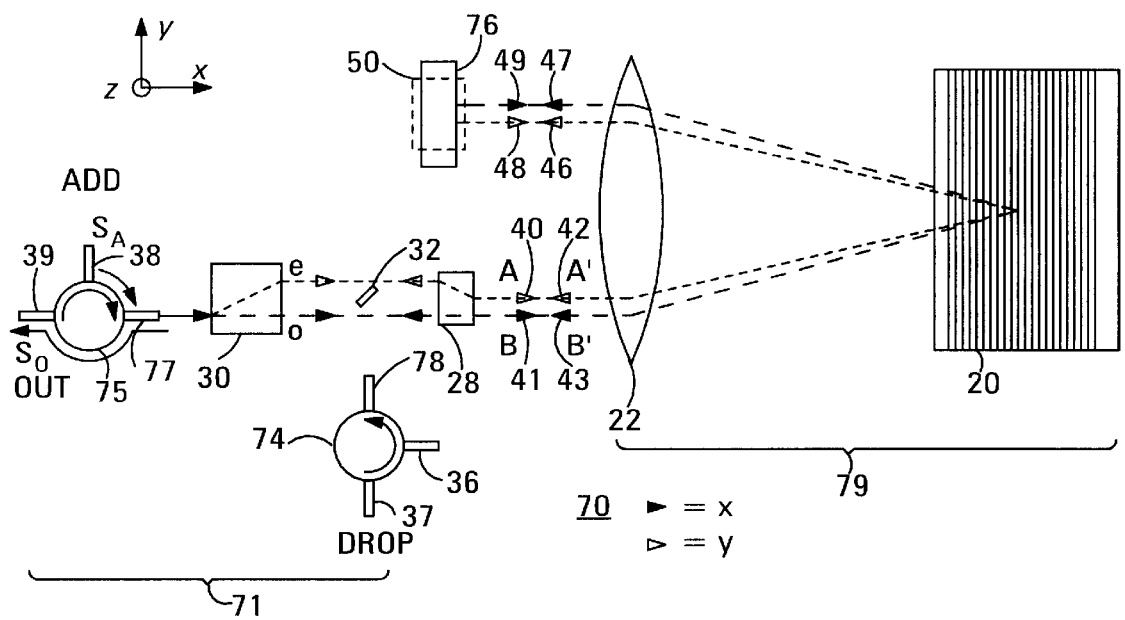
FIG. 7C is a schematic side view of the COADM shown in FIG. 6A illustrating the operation of the COADM with channel I in its add mode.
Figure 7D:
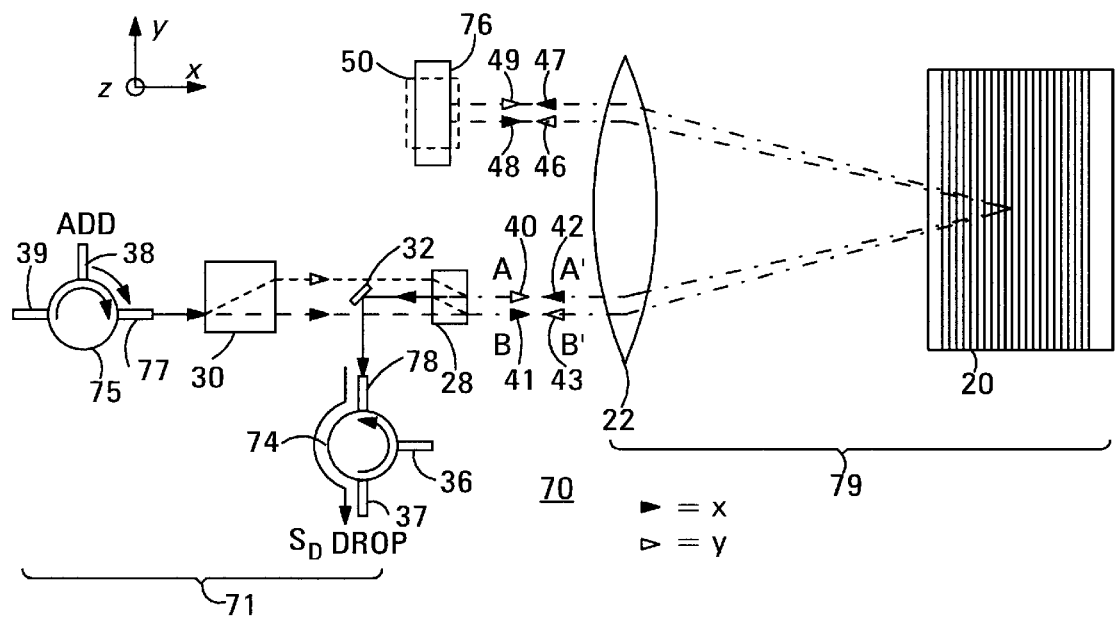
FIG. 7D is a schematic side view of the COADM shown in FIG. 6A illustrating the operation of the COADM with channel I in its add-drop mode.

FIGS. 7B, 7C and 7D show the operation of the COADM 70 with channel I in its pass, add and add-drop modes respectively. Operation of the COADM 70 with channel I in these modes is similar to the operation of the COADM 10 with channel I in these modes, described above with reference to FIGS. 3B, 3C and 3D, respectively. Accordingly, FIGS. 7B, 7C and 7D will only be described briefly.

In FIG. 7B (pass mode), the input/output optics 71 receive the DWDM input signal $S_I$ that includes the channel I optical signal via the input port 36. Consequently, the polarization component 40 fed into the optical path A includes the polarization components 46 derived from the channel I optical signal and polarized in the y-direction, and the polarization component 41 fed into the optical path B includes the polarization component 47 derived from the channel I optical signal and polarized in the z-direction, as described above with reference to FIG. 6C.

In the pass mode, the control cell 50 rotates the directions of polarization of the spectral components 46 and 47 through an angle of 90°, so the polarization components 42 and 43 that enter the optical input paths A' and B' of the input/output optics from the spectral demux/mux 79 include the spectral components 48 and 49 polarized in the z- and y-directions, respectively. Consequently, the input/output optics spatially overlap the spectral components to form the channel I optical signal of the DWDM output signal $S_O$ and direct this signal to the output port 39, as described above with reference to FIG. 6F.

In FIG. 7C (add mode), the input/output optics 71 receive the DWDM add signal $S_A$ that includes the channel I optical signal at the add port 38. Consequently, the polarization component 40 fed into the optical path A includes the polarization components 46 derived from the channel I optical signal and polarized in the z-direction, and the polarization component 41 fed into the optical path B includes the polarization component 47 derived from the channel I optical signal and polarized in the y-direction, as described above with reference to FIG. 6D.

In the add mode, the control cell 50 rotates the directions of polarization of the spectral components 46 and 47 through an angle of 0°, so the polarization components 42 and 43 entering the optical input paths A' and B' of the input/output optics 71 from the spectral demux/mux 79 include the spectral components 48 and 49 polarized in the z-direction and the y-direction, respectively. Consequently, the input/output optics spatially overlap the spectral components 48 and 49 to form the channel I optical signal of the DWDM output signal $S_O$ and direct this signal to the output port 39, as described above with reference to FIG. 6F.

In FIG. 7D (add-drop mode), the input/output optics 71 receive the DWDM add signal $S_A$ that includes the channel I optical signal at the add port 38. Consequently, Consequently, the polarization component 40 fed into the optical path A includes the polarization components 46 derived from the channel I optical signal and polarized in the z-direction, and the polarization component 41 fed into the optical path B includes the polarization component 47 derived from the channel I optical signal and polarized in the y-direction, as described above with reference to FIG. 6D.

In the add-drop mode, the control cell 50 rotates the directions of polarization of the spectral components through an angle of 90°, as described above with reference to FIG. 7B, so the polarization components 42 and 43 entering the optical input paths A' and B' of the input/output optics 71 from the spectral demux/mux 79 include the spectral components 48 and 49 polarized in the y-direction and the z-direction, respectively. Consequently, the input/output optics spatially overlap the spectral components 48 and 49 to form the channel I optical signal of the DWDM drop signal $S_D$ and direct this signal to the drop port 37, as described above with reference to FIG. 6E.

The invention has been described with reference to embodiments in which the spectral demux/mux includes a transmissive converging element, such as the lens 22. However, this is not critical to the invention. The spectral demux/mux can alternatively include reflective converging elements.

Figure 8A:
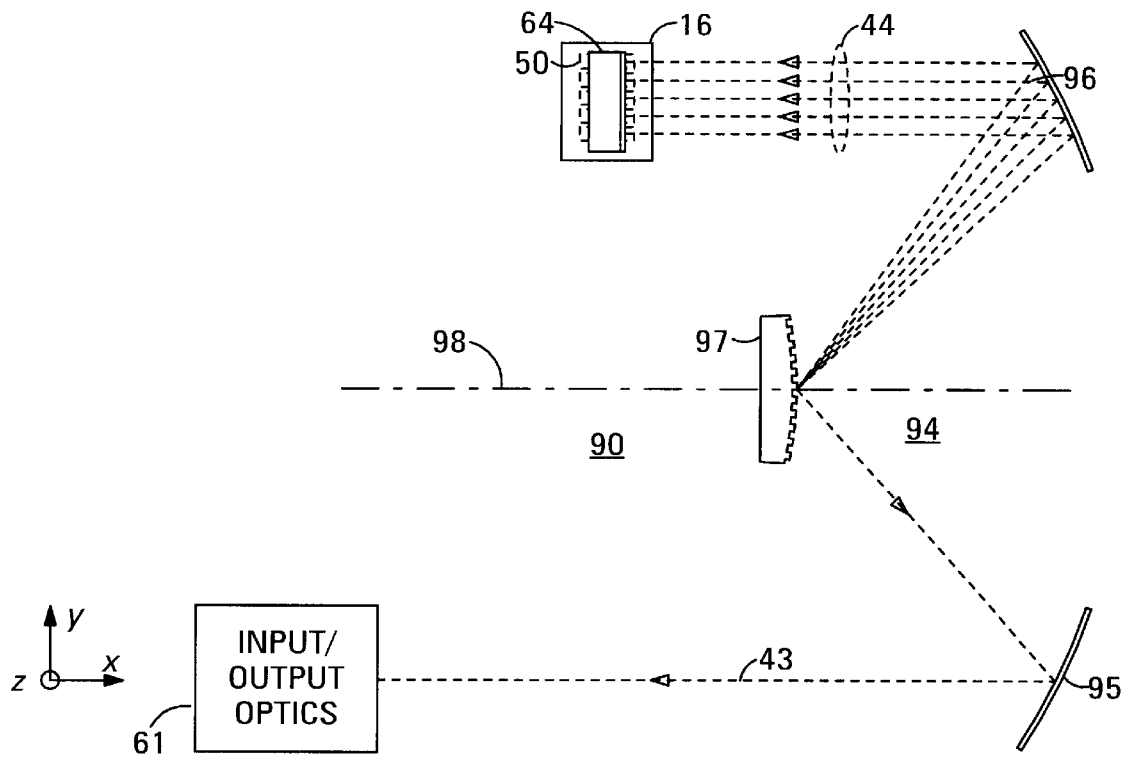
FIG. 8A is a schematic top view of a fourth embodiment of a COADM according to the invention.
Figure 8B:
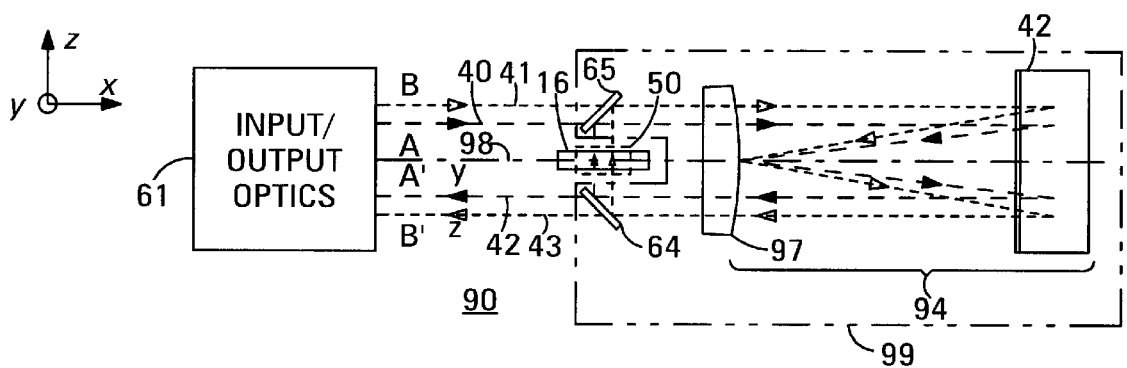
FIG. 8B is a schematic side view of the COADM shown in FIG. 8A.

FIGS. 8A and 8B show an embodiment 90 of a COADM according to the invention in which the spectral demux/mux 99 is composed of the Offner spectrometer 94 and the turning mirrors 64 and 65. The COADM 90 is based on the COADM 60 shown in FIGS. 4A and 4B. Elements of the COADM 90 that correspond to elements of the COADM 60 are indicated using the same reference numerals and will not be described again here. It will be apparent to a person of ordinary skill in the art that the COADMS 10 and 70 can be similarly modified to incorporate a spectral demux/mux based on an Offner spectrometer.

In the spectral demux/mux 99, the Offner spectrometer 94 is composed of the concave spherical mirrors 95 and 96 and the reflective convex spherical diffraction grating 97. The concave mirrors have a common center of curvature and each has a radius of approximately 2r. The convex grating is concentric with the concave mirrors and a radius of r. The concave mirrors serve as converging elements and the grating serves as a frequency-dispersive device. The convex grating 97 is centered in the y-z plane between the input output optics 61 and the LC polarization controller 16 and is located between the input/output optics and the concave mirror 95. The center of the convex grating defines the position of the optical axis 98 of the Offner spectrometer. The optical axis extends in the x-direction. The concave mirror 95 is axially aligned with the input/output optics and the concave mirror 96 is axially aligned with the LC polarization controller. The concave mirror 95 is located such that light output via the optical paths A and B of the input/output optics and travelling parallel to the optical axis 98 is directed to the center of the convex grating 97. The concave mirror 96 is located such that light travelling parallel to the optical axis 98 after passing through the LC polarization controller and reflection by the turning mirror 64 is directed to the center of the convex grating 97.

The convex grating 97 is composed of a diffraction grating mounted on a convex reflector. The spectral dispersion of the grating is chosen so that each pair of spectral components generated by the grating from a pair of polarization components is incident on a different control cell of the transmissive LC polarization controller 16.

Figure 9A:
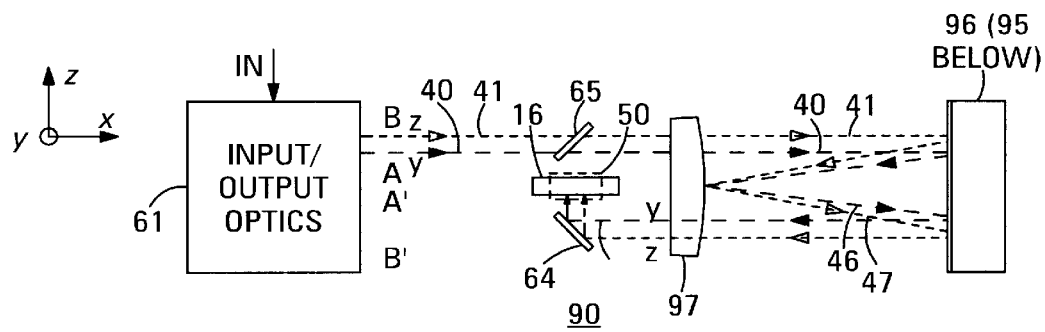
FIG. 9A is a schematic side view of the COADM shown in FIG. 8A illustrating the operation of part of the COADM with an optical signal at its input port.
Figure 9B:
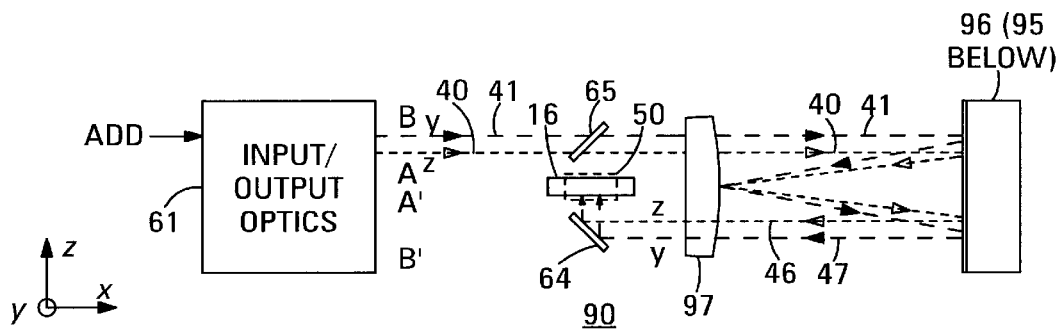
FIG. 9B is a schematic side view of the COADM shown in FIG. 8A illustrating the operation of part of the COADM with an optical signal at its add port.
Figure 9C:
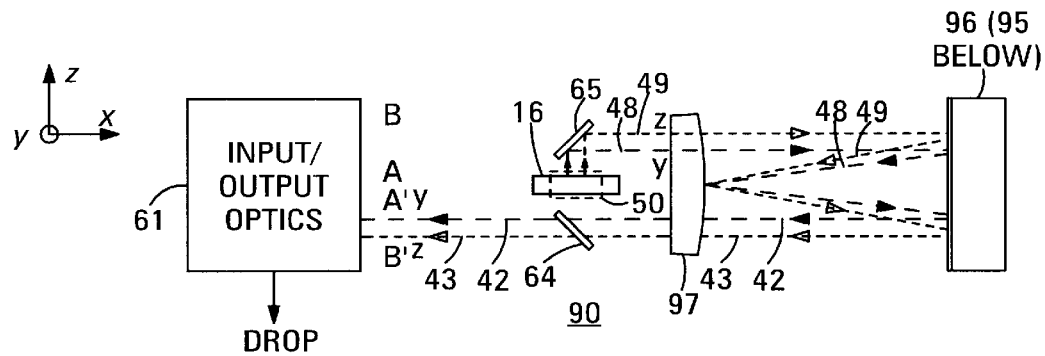
FIG. 9C is a schematic side view of the COADM shown in FIG. 8A illustrating the operation of part of the COADM to feed an optical signal to its drop port.
Figure 9D:
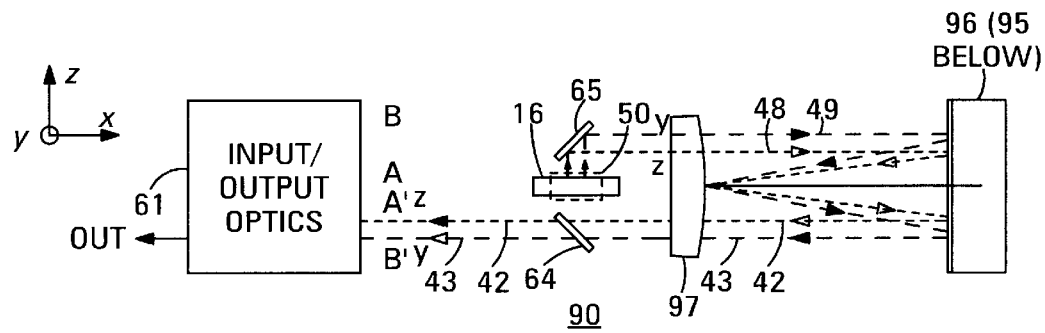
FIG. 9D is a schematic side view of the COADM shown in FIG. 8A illustrating the operation of the COADM to feed an optical signal to its output port.

Operation of the COADM 90 with channel I in its various operating modes will be described with reference to FIGS. 9A–9D. In side views similar to those have been used above to illustrate the operation of the COADMS according to the invention, the spectral components travelling between the concave mirror 96 and the LC polarization controller 16 via the turning mirrors 64 and 65 hide the polarization components travelling between the input/output optics 61 and the concave mirror 95. Accordingly, a different approach will be used. FIGS. 9A and 9B show only the portion of the optical path between the input/output optics 61 and the LC polarization controller 16 when a DWDM signal is received via the input port or via the add port, respectively. FIGS. 9C and 9D show only the portion of the optical path between the LC polarization controller and the input/output optics 61 when the DWDM signal is directed to the drop port and the output port, respectively.

Operation of the above-described COADM 90 with channel I in its drop mode will now be briefly described with reference to FIGS. 9A and 9C. Turning first to FIG. 9A, the input/output optics 61 derive the polarization components 40 and 41 from the DWDM input signal $S_I$ and output the polarization components to the spectral demux/mux 99 via the optical output paths A and B, respectively, as described above. The optical output paths are parallel to one another and to the optical axis 98, and are separated from one another by one walk-off unit in the z-direction. The polarization components 40 and 41 include the spectral components 46 and 47, respectively, derived from the channel I optical signal. Since the channel I optical signal from which the spectral components are derived is received via the input port, the spectral component 46 in the polarization component 40 fed into the optical output path A is polarized in the y-direction and the spectral component 47 in the polarization component 41 fed into the optical output path B is polarized in the z-direction, as described above with reference to FIG. 4B.

In the spectral demux/mux 99, the polarization components 40 and 41 enter the Offner spectrometer 94 where the concave mirror 95 directs the polarization components to the convex grating 97. The convex grating spatially separates the pair of polarization components in the y-direction into pairs of spectral components in accordance with the frequencies of the spectral components. FIG. 8A shows an example in which the five spectral components 44 polarized in the z-direction are derived from the polarization component 41 output from the input/output optics 61 via the optical path B. The polarization component 41 is hidden by the polarization component 43 in the drawing. Moreover, the five spectral components polarized in the y-direction and derived from the polarization component 40 are hidden by the spectral components 44. In the frequency-dispersed portion of the optical path that extends from the convex grating 97 through the LC polarization controller 16 and back to the convex grating, the side views of FIGS. 9A and 9B show the spatial separation in the z-direction between the channel I spectral components 46 and 47 and the side views of FIGS. 9C and 9D show the spatial separation in the z-direction between the channel I spectral components 48 and 49.

The convex grating 97 reflects the spatially-separated spectral components towards the concave mirror 96. The concave mirror 96 deflects the spectral components so that they travel parallel to the optical axis 98. The turning mirror 64 is located to intercept the spectral components and to reflect them through substantially 90° so that they are incident on the LC polarization controller 16 with a zero angle of incidence.

Each pair of spectral components passes through a different one of the control cells of the LC polarization controller, as described above and shown in FIGS. 8A and 8B. FIG. 9A shows the channel I spectral components 46 and 47, polarized in the y- and z-directions, respectively, incident on the control cell 50. In the drop mode, the control signal applied to the control cell 50 is in its 0 state, so the spectral components 46 and 47 are rotated through an angle of 0° as they pass through the control cell 50, and are output as the channel I spectral components 48 and 49 polarized in the y- and z-directions, respectively, as shown in FIG. 9C.

The spectral components emerging from the LC polarization controller 16 are reflected through substantially 90° by the second turning mirror 65 so that they once more travel parallel to the optical axis 98 back towards the Offner spectrometer 94. The spectral components are located on the opposite side of the optical axis 98 to the spectral components incident on the turning mirror 64 and are separated from the optical axis by the same distance.

In the Offner spectrometer 94, the concave mirror 96 reflects the spectral components towards the convex grating 97. The convex grating 97 spatially overlaps the pairs of spectral components to form a pair of polarization components. The pair of polarization components is composed of the polarization components 42 and 43. The convex grating reflects the polarization components towards the concave mirror 95. The concave mirror 95 directs the polarization components so that they once more travel parallel to one another and to the optical axis 98 and are spatially separated from one another by one walk-off unit in the z-direction. Thus, the spectral demux/mux 99 outputs the polarization components 42 and 43 aligned with the optical input paths A' and B', respectively, of the input/output optics 61.

The polarization components 42 and 43 enter the input/output optics 61. The polarization component 42 that enters via optical input path A' includes the spectral component 48 polarized in the y-direction (long-dash line) and the polarization component 43 that enters via the optical input path B' includes the spectral components 49 polarized in the z-direction (short-dash line). The input/output optics spatially overlap the spectral components 48 and 49 to form the channel I optical signal of the DWDM drop signal $S_D$, and direct this signal to the drop port, as described above with reference to FIG. 4B.

Operation of the above-described COADM 90 with channel I in its pass mode is shown in FIGS. 9A and 9D, in its add mode in FIGS. 9B and 9C and in its add-drop mode in FIGS. 9B and 9C. In the add mode, the control cell 50 rotates the directions of polarization of the spectral components passing through it through an angle of 0°. In the pass and add-drop modes, the control cell 50 rotates the directions of polarization of the spectral components passing through it through an angle of 90°. Operation of the COADM 90 will not be further described.

Other forms of reflection-based spectrometers, such as a Dyson spectrometer can be used in lieu of the Offner spectrometer 99 in the COADM 90.

The method 100 according to the invention for dropping a drop optical signal from a multi-frequency optical signal, such as a DWDM optical signal, will now be described with reference to FIG. 10. In process 102, the multi-frequency optical signal is received.

In process 104, the multi-frequency optical signal is spatially separated into a first polarization component and a second polarization component having orthogonal directions of polarization.

In process 106, the first polarization component and the second polarization component are spatially separated into first spectral components and second spectral components, respectively. The first spectral components and the second spectral components respectively include a first drop spectral component and a second drop spectral component originating from the drop optical signal.

In process 108, the polarizations of the first drop spectral component and others of the first spectral components are set orthogonal to one another and the polarizations of the second drop spectral component and others of the second spectral components are set orthogonal to one another. This may be done by rotating the polarizations of the first drop spectral component and the second drop spectral component through 90° and rotating the polarizations of the others of the first spectral components and the others of the second spectral components through 0°. Alternatively, the polarizations of the first drop spectral component and the second drop spectral component may be rotated through 0° and the polarizations of the others of the first spectral components and the others of the second spectral components may be rotated through 90°, as in the example shown in FIG. 3B.

Additional ones of the first and second spectral components may have their polarizations set parallel to those of the first drop spectral component and the second drop spectral component, respectively, when the optical signals from which these additional ones of the spectral components originate are to be dropped in addition to the drop optical signal.

In process 110, the first spectral components are spatially overlapped to generate a third polarization component. The third polarization component includes the first drop spectral component polarized orthogonally to the others of the first spectral components. Additionally, the second spectral components are spatially overlapped to generate a fourth polarization component spatially separated from the third polarization component. The fourth polarization component includes the second drop spectral component polarized orthogonally to the others of the second spectral components.

Finally, in process 112, the third polarization component and the fourth polarization component are polarization-dependently spatially overlapped to generate the drop optical signal from the first drop spectral component and the second drop spectral component.

Figure 10:
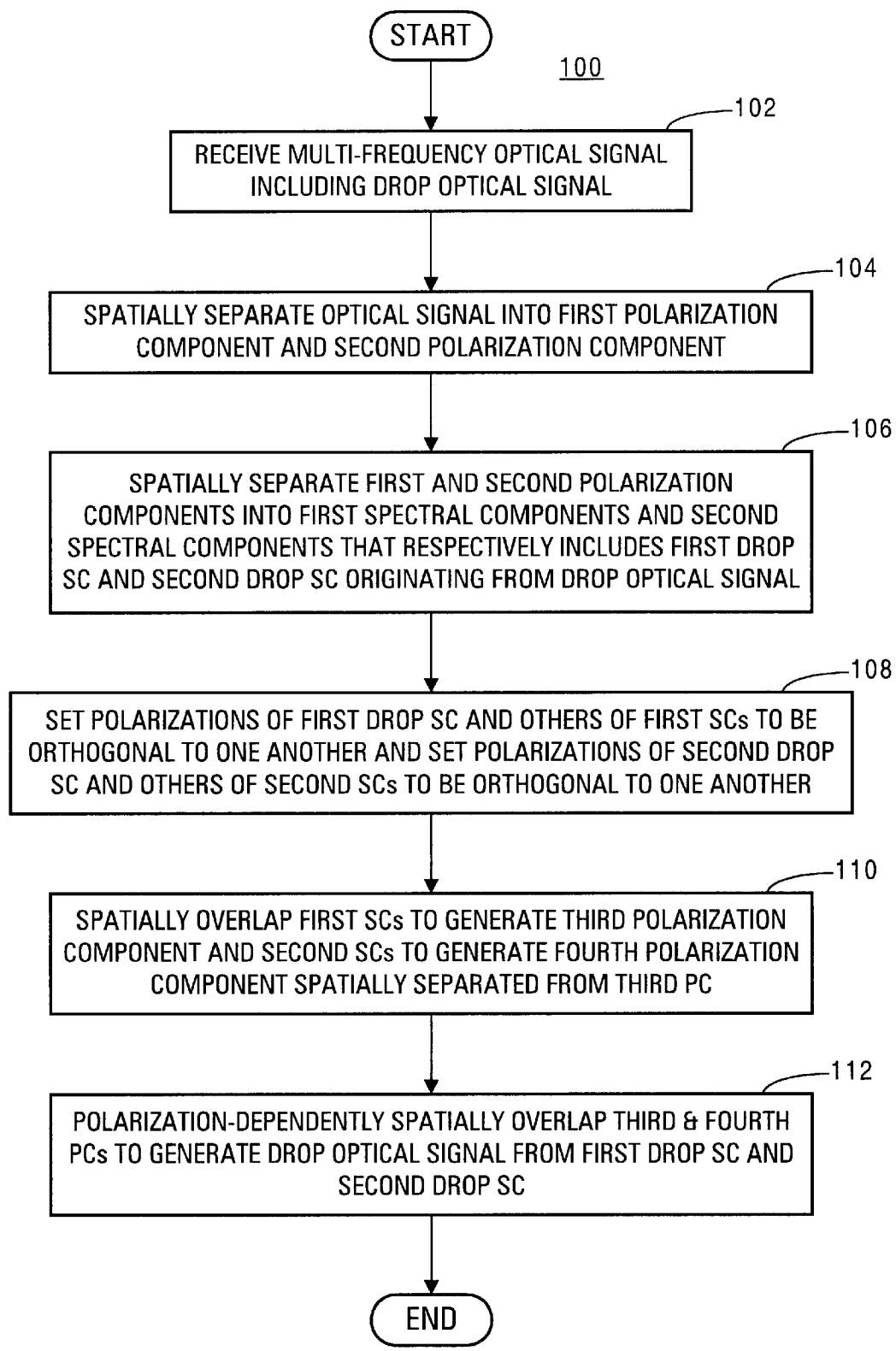
FIG. 10 is a flow chart illustrating the method according to the invention for selecting a drop signal from a multi-frequency optical signal, such as a DWDM optical signal.

Although not shown in FIG. 10, the method 100 may additionally include polarization-dependently spatially overlapping the third polarization component and the fourth polarization component in a direction opposite the direction in which the first drop spectral component and the second drop spectral component are overlapped to generate a second multi-frequency optical signal that lacks the drop optical signal. The second multi-frequency optical signal is generated from the others of the first spectral components included in the third polarization component and the others of the second spectral components included in the fourth polarization component.

Figure 11:
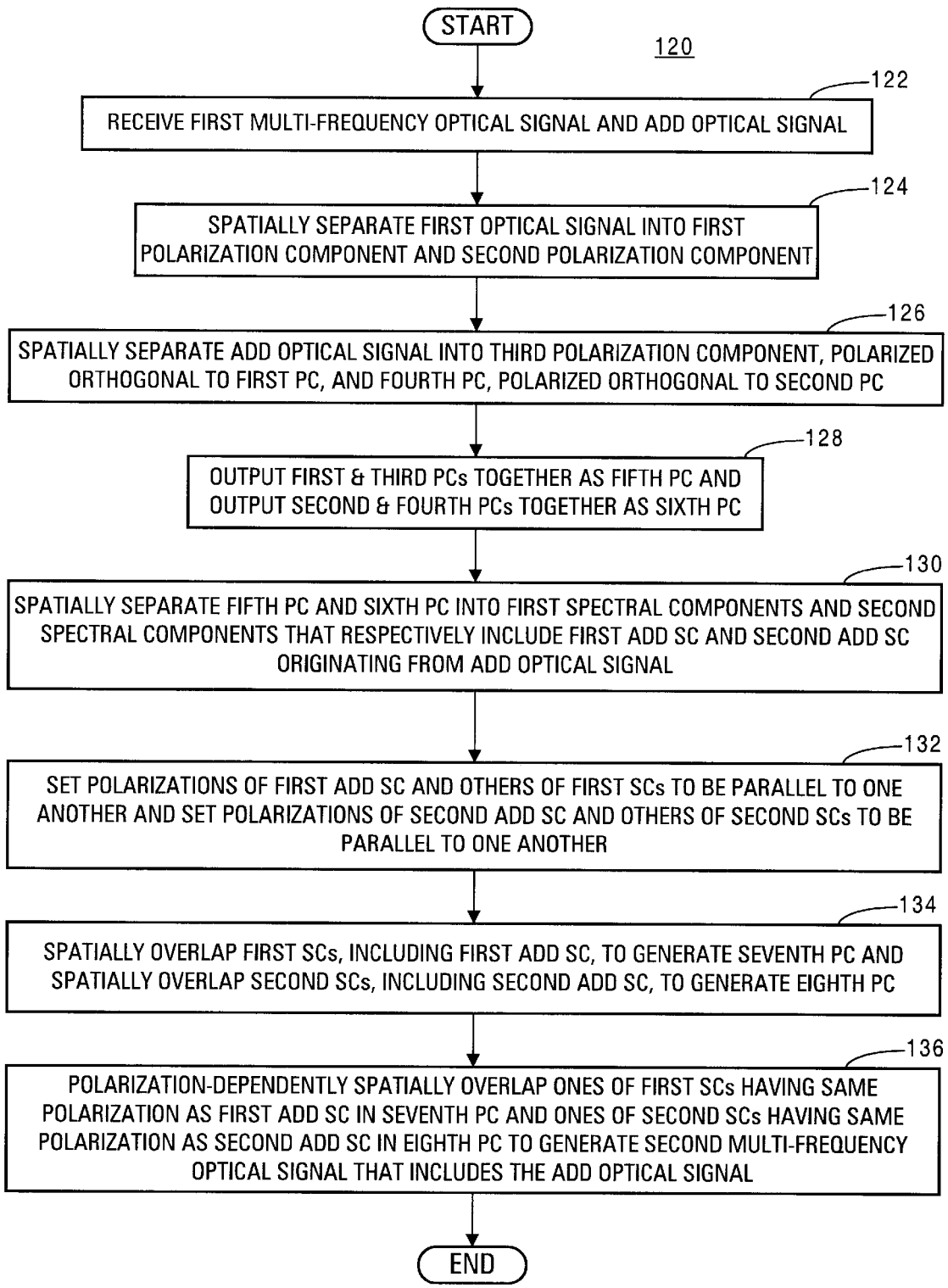
FIG. 11 is a flow chart illustrating the method according to the invention for adding an add optical signal to a first multi-frequency optical signal, such as a DWDM optical signal, to generate a second multi-frequency optical signal that includes the add optical signal.

FIG. 11 shows the method 120 according to the invention for adding an add optical signal to a first multi-frequency optical signal to generate a second multi-frequency optical signal that includes the add optical signal. In process 122, the add optical signal and the multi-frequency optical signal are received.

In process 124, the first multi-frequency optical signal is spatially separated into a first polarization component and a second polarization component having orthogonal polarizations.

In process 126, the add optical signal is spatially separated into a third polarization component polarized orthogonally to the first polarization component and a fourth polarization component polarized orthogonally to the second polarization component.

In process 128, the first and third polarization components are output together as a fifth polarization component and the second and fourth polarization components are output together as a sixth polarization component.

In process 130, the fifth polarization component and the sixth polarization component are spatially separated into first spectral components and second spectral components, respectively. The first spectral components and the second spectral components respectively include a first add spectral component and a second add spectral component originating from the add optical signal.

In process 132, the polarizations of the first add spectral component and others of the first spectral components are set to be parallel to one another and the polarizations of the second add spectral component and others of the second spectral components are set to be parallel to one another. This may be done by rotating the polarizations of the first add spectral component and the second add spectral component through 90° and rotating the polarizations of the others of the first spectral components and the others of the second spectral components through 0°. Alternatively, the polarizations of the first add spectral component and the second add spectral component may be rotated through 0°, as in the example shown in FIG. 3C, and the polarizations of the others of the first spectral components and the others of the second spectral components may be rotated through 90°, as in the example shown in FIG. 3B.

Additional ones of the first and second spectral components originating in one or more additional add optical signals may also have their polarizations set parallel to those of the first add spectral component and the second add spectral component, respectively. The optical signals from which these additional ones of the spectral components originate are then added to the first multi-frequency drop optical signal in addition to the add optical signal.

In process 134, the first spectral components, including the add first spectral component, are spatially overlapped to generate a seventh polarization component and the second spectral components, including the second add spectral component, are spatially overlapped to generate an eighth polarization component spatially separated from the seventh polarization component.

Finally, in process 136, ones of the first spectral components having the same polarization as the first add spectral component in the seventh polarization component and ones of the second spectral components having the same polarization as the second add spectral component in the eighth polarization component are polarization-dependently spatially overlapped to generate the second multi-frequency optical signal.

Although not shown in FIG. 11, the method 120 may additionally drop from the first multi-frequency optical signal a drop optical signal having the same optical frequency as the add optical signal. In this case, in process 130, the first spectral components additionally include a first drop spectral component and the second spectral components additionally include a second drop spectral component that originate from the drop optical signal. In process 132, the polarizations of first drop spectral component and the first add spectral component are set to be orthogonal to one another and those of the second drop spectral component and the second add spectral component are set to be orthogonal to one another. Additionally, the seventh polarization component and the eighth polarization component are polarization-dependently spatially overlapped in a direction opposite to the direction in which they are overlapped to generate the second multi-frequency optical signal. Overlapping the seventh and eighth polarization component in this opposite direction generates the drop optical signal from the first drop spectral component and the second drop spectral component.

The invention is described above with reference to exemplary embodiments. It will be apparent to the person of ordinary skill in the art that the optical functions described above can be obtained using optical arrangements different from those shown. For example, in the embodiment shown in FIGS. 1A and 1B, the turning mirrors 34 and 35 can be respectively situated between the single polarization-dispersive devices 28 and 29 and the pick-off mirrors 32 and 33. With such an arrangement, the double polarization-dispersive devices 30 and 31 are disposed orthogonal to the single polarization-dispersive devices.

Moreover, the invention has been described with reference to exemplary embodiments in which the single and double polarization-dispersive devices 28–31 are simple walk-off crystals. The ordinary polarization component passes through a walk-off crystal without deviation and only the extra-ordinary polarization component is deviated. Such embodiments are suitable when the optical signals are modulated with relatively low-frequency information signals. However, the differing transit times of the polarization components through the walk-off crystal introduce a time dispersion between the polarization components. The time dispersion can cause problems when higher modulation frequencies are used. This problem can be overcome by using a Savant plate or other zero time dispersion element for each polarization-dispersive device. Zero time dispersion devices provide equal optical path lengths for the o-polarization component and the e-polarization component.

The invention has also been described with reference to exemplary embodiments in which the single and double polarization-dispersive devices 28–31 comprise birefringent materials. However this is not critical to the invention. The polarization-dispersive devices may each comprise a periscope composed of a polarizing beamsplitter and a reflector.

Although this disclosure describes illustrative embodiments of the invention in detail, it is to be understood that the invention is not limited to the precise embodiments described, and that various modifications may be practiced within the scope of the invention defined by the appended claims.

We claim:

1. A frequency-selective optical multiplexer, comprising;
    input/output optics, including:
        two ports,
        a first optical path and a second optical path spatially separated from one another by a first distance in a first direction, and
        polarization-dispersive optics disposed between the ports and the optical paths, and structured to generate from an optical signal a pair of polarization components composed of a first and a second polarization component having orthogonal directions of polarization, and to output the first and second polarization components via the first and second optical paths, respectively, the first and second polarization components having first and second polarization directions, respectively, when the optical signal is received at one of the ports, and having the second and the first polarization directions, respectively, when the optical signal is received at the other of the ports;
    an LC polarization controller; and
    spectral demux/mux means for generating, from a first pair of orthogonal polarization components received from the input/output optics, first pairs of spectral components spatially separated in a direction orthogonal to the first direction, for outputting the first pairs of spectral components to the LC polarization controller, for receiving respective second pairs of spectral components from the LC polarization controller, and for spatially overlapping the second pairs of spectral components to generate a second pair of polarization components for return to the input/output optics, one of the first and the second pairs of polarization components passing between the spectral demux/mux means and the input/output optics via the optical paths, in which:
        the LC polarization controller is located to receive the first pairs of spectral components at a zero angle of incidence, and operates to rotate the polarizations of each of the first pairs of spectral components individually and selectively through an angle of one of (a) 0° and (b) 90° to generate one of the second pairs of spectral components.

2. The frequency-selective optical multiplexer of claim 1, in which:

the ports are an input port and an add port;

the polarization-dispersive optics are input optics and generate the first pair of polarization components;

the first pair of polarization components passes from the polarization-dispersive optics to the spectral demux/mux means via the first and second optical paths;

the frequency-selective optical multiplexer additionally comprises:
- a drop port and an output port,
- a third optical path and a fourth optical path, and
- additional polarization-dispersive optics located between the drop port, the output port, the third optical path and the fourth optical path; and the second pair of polarization components passes from the spectral demux/mux means to the additional polarization-dispersive optics via the third and fourth optical paths.

3. The frequency-selective optical multiplexer of claim 1, in which:

the ports are an input port and an add port;

the frequency-selective optical multiplexer additionally comprises an drop port and an output port; and the input/output optics additionally comprise:
- a first circulator having ports coupled to the input port, the drop port and the polarization-dispersive optics, and
- a second circulator having ports coupled to the add port, the output port and the polarization-dispersive optics.

4. The frequency-selective optical multiplexer of claim 1, in which:

each of the ports is optically aligned with one of the first optical path and the second optical path; and the polarization-dispersive optics include:
- a double polarization-dispersive device,
- a pick-off mirror, and
- a single polarization-dispersive device, arranged in order between one of the ports and the optical paths.

5. The frequency-selective optical multiplexer of claim 4, in which a reflection of one of the ports in the pick-off mirror is optically aligned with one of the optical paths.

6. The frequency-selective optical multiplexer of claim 5, in which:

the polarization-dispersive optics additionally include a turning mirror; and a reflection of the other of the ports in the turning mirror is optically aligned with the other of the optical paths.

7. The frequency-selective optical multiplexer of claim 4, in which:

the single polarization-dispersive device has a walk-off distance; and the first distance is equal to the walk-off distance.

8. The frequency-selective optical multiplexer of claim 1, in which the spectral demux/mux means includes a spectral demultiplexer comprising:

a transmissive converging element; and a frequency-dispersive device located to receive light from the converging element and to return light to the converging element.

9. The frequency-selective optical multiplexer of claim 1, in which the spectral demux/mux means includes no more than one frequency-dispersive element.

10. The frequency-selective optical multiplexer of claim 9, in which:

the spectral demux/mux means additionally includes:
- a first turning mirror located to receive the first spectral components from the frequency-dispersive element, and
- a second turning mirror located to direct the second spectral components back to the frequency-dispersive element; and the LC polarization controller is interposed between the first turning mirror and the second turning mirror.

11. The frequency-selective optical multiplexer of claim 9, in which:

spectral demux/mux means includes a path through which the first pairs of spectral components are output; and the LC polarization controller is a reflective LC polarization controller that reflects the second pairs of spectral components back to the spectral demux/mux means via the path.

12. The frequency-selective optical multiplexer of claim 1, in which:

the spectral demux/mux means includes a first spectral demultiplexer arranged back-to-back with a second spectral demultiplexer; and the LC polarization controller is a transmissive LC polarization controller interposed between the first spectral demultiplexer and the second spectral demultiplexer.

13. The frequency-selective optical multiplexer of claim 1, in which the spectral demux/mux means includes a spectral demultiplexer comprising:

a convex frequency-dispersive device; and a first concave mirror located to direct the first pair of polarization components to a point on the convex frequency-dispersive device; and a second concave mirror located to direct the first pairs of spectral components diverging from the point on the convex frequency-dispersive device towards the LC polarization controller.

14. The frequency-selective optical multiplexer of claim 1, in which the spectral demux/mux means includes a spectral demultiplexer comprising an Offner spectrometer.

15. A method of dropping a drop optical signal from a first multi-frequency optical signal, the method comprising:

receiving the first multi-frequency optical signal;

spatially separating the first multi-frequency optical signal into a first polarization component and a second polarization component having orthogonal directions of polarization;

spatially separating the first polarization component and the second polarization component into first spectral components and second spectral components, respectively, the first spectral components and the second spectral components respectively including a first drop spectral component and a second drop spectral component originating from the drop optical signal;

setting the polarizations of the first drop spectral component and others of the first spectral components to be orthogonal to one another and those of the second drop spectral component and others of the second spectral components to be orthogonal to one another;

spatially overlapping the first spectral components to generate a third polarization component, the third polarization component including the first drop spectral component polarized orthogonally to the others of the first spectral components, and spatially overlapping the second spectral components to generate a fourth polarization component spatially separated from the third polarization component, the fourth polarization component including the second drop spectral component polarized orthogonally to the others of the second spectral components; and polarization-dependently spatially overlapping the third polarization component and the fourth polarization component to generate the drop optical signal from the first drop spectral component and the second drop spectral component.

16. The method of claim 15, in which:

in polarization-dependently spatially overlapping the third polarization component and the fourth polarization component, the drop polarization components are overlapped in a first direction; and the method additionally comprises spatially overlapping the third polarization component and the fourth polarization component in a direction opposite the first direction to generate a second multi-frequency optical signal lacking the drop optical signal from the others of the first spectral components included in the third polarization component and the others of the second spectral components included in the fourth polarization component.

17. The method of claim 15, in which setting the polarizations includes rotating one of (a) the polarizations of the first drop spectral component and the second drop spectral component and (b) the polarizations of the others of the first spectral components and the others of the second spectral components through an angle of 90°.

18. A method for adding an add optical signal to a first multi-frequency optical signal to generate a second multi-frequency optical signal that includes the add optical signal, the method comprising:

receiving the add optical signal and the multi-frequency optical signal;

spatially separating the first multi-frequency optical signal into a first polarization component and a second polarization component having orthogonal polarizations;

spatially separating the add optical signal into a third polarization component polarized orthogonally to the first polarization component and a fourth polarization component polarized orthogonally to the second polarization component;

outputting the first and third polarization components as a fifth polarization component and the second and fourth polarization components as a sixth polarization component;

spatially separating the fifth polarization component and the sixth polarization component into first spectral components and second spectral components, respectively, the first spectral components and the second spectral components respectively including a first add spectral component and a second add spectral component originating from the add optical signal;

setting the polarizations of the first add spectral component and others of the first spectral components to be parallel to one another and setting those of the second add spectral component and others of the second spectral components to be parallel to one another;

spatially overlapping the first spectral components, including the add spectral component, to generate a seventh polarization component and spatially overlapping the second spectral components, including the second add spectral component, to generate an eighth polarization component spatially separated from the seventh polarization component; and polarization-dependently spatially overlapping ones of the first spectral components having the same polarization as the first add spectral component in the seventh polarization component and ones of the second spectral components having the same polarization as the second add spectral component in the eighth polarization component to generate the second multi-frequency optical signal.

19. The method of claim 17, in which:

the first multi-frequency optical signal includes a drop optical signal having a frequency equal to the add optical signal;

the first spectral components additionally include a first drop spectral component and the second spectral components additionally include a second drop spectral component;

in setting the polarizations, the polarizations of first drop spectral component and the first add spectral component are set to be orthogonal to one another and those of the second drop spectral component and the second add spectral component are set to be orthogonal to one another;

in polarization-dependently spatially overlapping the seventh polarization component and the eighth polarization component, the seventh polarization component and the eighth polarization component are spatially overlapped in a first direction; and the method additionally comprises polarization-dependently spatially overlapping the seventh polarization component and the eighth polarization component in a direction opposite to the first direction to generate the drop optical signal from the first drop spectral component and the second drop spectral component.

20. The method of claim 18, in which setting the polarizations includes rotating one of (a) the polarizations of the first add spectral component and the second add spectral component and (b) the polarizations of the others of the first spectral components and the others of the second spectral components through an angle of 90°.

* * * * *